(12) United States Patent
Anzai

(10) Patent No.: US 6,719,396 B2
(45) Date of Patent: Apr. 13, 2004

(54) MOTOR CONTROL METHOD IN RECORDING APPARATUS AND RECORDING APPARATUS

(75) Inventor: Sumito Anzai, Nagano (JP)

(73) Assignee: Seiko Epson Corporation, Tokyo (JP)

(*) Notice: Subject to any disclaimer, the term of this patent is extended or adjusted under 35 U.S.C. 154(b) by 38 days.

(21) Appl. No.: 10/232,833

(22) Filed: Sep. 3, 2002

(65) Prior Publication Data
US 2003/0067507 A1 Apr. 10, 2003

(30) Foreign Application Priority Data

Aug. 31, 2001 (JP) .................. P2001-265120
Aug. 31, 2001 (JP) .................. P2001-265121
Aug. 31, 2001 (JP) .................. P2001-265122

(51) Int. Cl.$^7$ .................. B41J 29/393; B41J 11/42
(52) U.S. Cl. .................. 347/19; 347/14; 347/17; 347/167; 400/582
(58) Field of Search .................. 347/19, 14, 17, 347/37, 41, 10, 167; 318/565, 685, 696; 400/582, 578; 310/68 C

(56) References Cited

U.S. PATENT DOCUMENTS 6,364,551 B1 * 4/2002 Lesniak et al. .......... 400/582

FOREIGN PATENT DOCUMENTS

JP        8-258265 A     10/1996

* cited by examiner

Primary Examiner—Lamson Nguyen
(74) Attorney, Agent, or Firm—Sughrue Mion, PLLC

(57) ABSTRACT

A unit heat value $Q_{pass}$ ($=I_{pass}^2 \cdot t_{pass}$) per pass is calculated from a current value (an effective current value) $I_{pass}$ of a carriage motor with one pass of a carriage (one-way running in a reciprocation) and a moving time (a motor driving time) $t_{pass}$ of the carriage. Then, the unit heat value $Q_{pass}$ is successively calculated to obtain a heat value $Q_{sigma}$ for a unit time $T_{box}$(=one minute). The heat value $Q_{sigma}$ is converted into a heat generation temperature $\Delta T_{new}$. The heat generation temperature $\Delta T_{new}$ is successively added in consideration of a spontaneous radiation with the passage of time to obtain a current heat generation temperature $\Delta T_{sum}$ ($\Delta T_{sum} = K \cdot \Delta T_{sum} + \Delta T_{new}$; K is a radiation factor). When $\Delta T_{sum}$ exceeds a threshold, a pause time for one pass of the carriage is provided.

21 Claims, 14 Drawing Sheets

FIG. 7

REFERENCE EFFECTIVE CURRENT TABLE IT
(REFERENCE EFFECTIVE CURRENT $I_{Base[Y][V]}$)

| MOVING DISTANCE | | MOVING SPEED V | | | | |
|---|---|---|---|---|---|---|
| | | 1 | 2 | 3 | ... | n |
| Y | ENCODER PULSE | V1 | V2 | V3 | ... | Vn |
| 1 | 100 | $I_{B11}$ | $I_{B12}$ | $I_{B13}$ | ... | $I_{B1n}$ |
| 2 | 200 | $I_{B21}$ | $I_{B22}$ | $I_{B23}$ | ... | $I_{B2n}$ |
| 3 | 300 | $I_{B31}$ | $I_{B32}$ | $I_{B33}$ | ... | $I_{B3n}$ |
| ⋮ | ... | ... | ... | ... | ... | ... |
| ⋮ | ... | ... | ... | ... | ... | ... |
| 20 | 2000 | $I_{B201}$ | $I_{B202}$ | $I_{B203}$ | ... | $I_{B20n}$ |

UNIT: mA

FIG. 8

CR1 PASS TIME TABLE PT     (1 PASS TIME $t_{pass[Y][V]}$)

| MOVING DISTANCE | | MOVING SPEED V | | | | |
|---|---|---|---|---|---|---|
| | | 1 | 2 | 3 | ... | n |
| Y | ENCODER PULSE | V1 | V2 | V3 | ... | Vn |
| 1 | 100 | $t_{p11}$ | $t_{p12}$ | $t_{p13}$ | ... | $t_{p1n}$ |
| 2 | 200 | $t_{p21}$ | $t_{p22}$ | $t_{p23}$ | ... | $t_{p2n}$ |
| 3 | 300 | $t_{p31}$ | $t_{p32}$ | $t_{p33}$ | ... | $t_{p3n}$ |
| ⋮ | ... | ... | ... | ... | ... | ... |
| ⋮ | ... | ... | ... | ... | ... | ... |
| 20 | 2000 | $t_{p201}$ | $t_{p202}$ | $t_{p203}$ | ... | $t_{p20n}$ |

UNIT: ms

FIG. 9

UNIT HEAT VALUE REFERENCE TABLE QT
(UNIT HEAT VALUE $Q_{passYV}$)

| MOVING DISTANCE | | MOVING SPEED V | | | | |
|---|---|---|---|---|---|---|
| | | 1 | 2 | 3 | ... | n |
| Y | ENCODER PULSE | V1 | V2 | V3 | ... | Vn |
| 1 | 100 | $Q_{11}$ | $Q_{12}$ | $Q_{13}$ | ... | $Q_{1n}$ |
| 2 | 200 | $Q_{21}$ | $Q_{22}$ | $Q_{23}$ | ... | $Q_{2n}$ |
| 3 | 300 | $Q_{31}$ | $Q_{32}$ | $Q_{33}$ | ... | $Q_{3n}$ |
| ⋮ | ... | ... | ... | ... | ... | ... |
| ⋮ | ... | ... | ... | ... | ... | ... |
| 20 | 2000 | $Q_{201}$ | $Q_{202}$ | $Q_{203}$ | ... | $Q_{20n}$ |

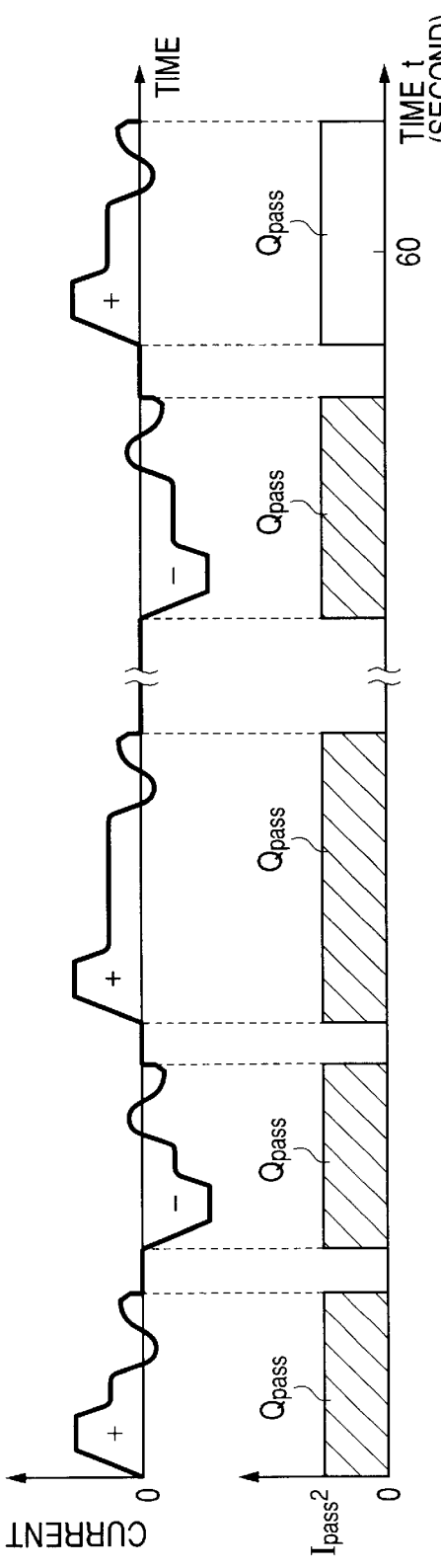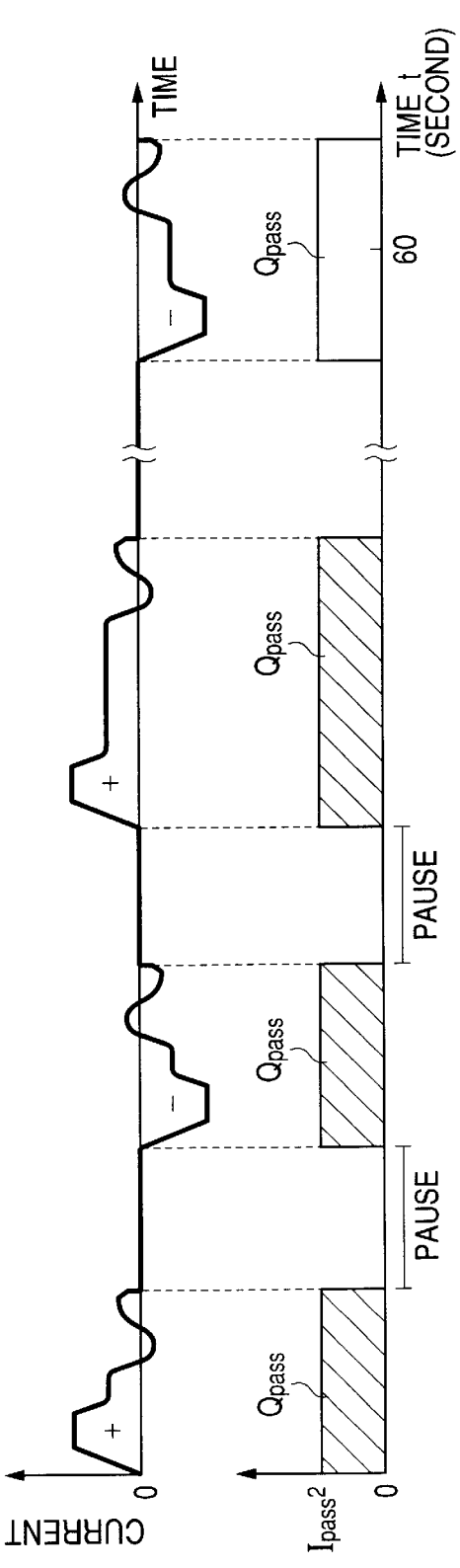

RADIATION SYSTEM (DURING CARRIAGE STOP)

FIG. 16

PAUSE TIME TABLE W1      (PAUSE TIME $T1_{waitYV}$)

| MOVING DISTANCE | | MOVING SPEED V | | | | |
|---|---|---|---|---|---|---|
| | | 1 | 2 | 3 | ... | n |
| Y | ENCODER PULSE | V1 | V2 | V3 | ... | Vn |
| 1 | 100 | $T1w_{11}$ | $T1w_{12}$ | $T1w_{13}$ | ... | $T1w_{1n}$ |
| 2 | 200 | $T1w_{21}$ | $T1w_{22}$ | $T1w_{23}$ | ... | $T1w_{2n}$ |
| 3 | 300 | $T1w_{31}$ | $T1w_{32}$ | $T1w_{33}$ | ... | $T1w_{3n}$ |
| ⋮ | ... | ... | ... | ... | ... | ... |
| ⋮ | ... | ... | ... | ... | ... | ... |
| 20 | 2000 | $T1w_{201}$ | $T1w_{202}$ | $T1w_{203}$ | ... | $T1w_{20n}$ |

UNIT: ms

FIG. 17

PAUSE TIME TABLE W2      (PAUSE TIME $T2_{waitYV}$)

| MOVING DISTANCE | | MOVING SPEED V | | | | |
|---|---|---|---|---|---|---|
| | | 1 | 2 | 3 | ... | n |
| Y | ENCODER PULSE | V1 | V2 | V3 | ... | Vn |
| 1 | 100 | $T2w_{11}$ | $T2w_{12}$ | $T2w_{13}$ | ... | $T2w_{1n}$ |
| 2 | 200 | $T2w_{21}$ | $T2w_{22}$ | $T2w_{23}$ | ... | $T2w_{2n}$ |
| 3 | 300 | $T2w_{31}$ | $T2w_{32}$ | $T2w_{33}$ | ... | $T2w_{3n}$ |
| ⋮ | ... | ... | ... | ... | ... | ... |
| ⋮ | ... | ... | ... | ... | ... | ... |
| 20 | 2000 | $T2w_{201}$ | $T2w_{202}$ | $T2w_{203}$ | ... | $T2w_{20n}$ |

UNIT: ms

MOTOR CONTROL METHOD IN RECORDING APPARATUS AND RECORDING APPARATUS

BACKGROUND OF THE INVENTION

The present invention relates to, in a recording apparatus such as a printer, a motor control method in a recording apparatus which serves to accurately estimate the heat generation of an electric motor without using a temperature sensor and to carry out control for limiting the heat generation of the electric motor based on information about the heat generation thus estimated, and the recording apparatus.

In a serial printer, conventionally, a carriage including a print head runs in a main scanning direction (an orthogonal direction to a paper feeding direction) so that printing is carried out over a print medium such as a paper, for example. The carriage is driven to run by a carriage motor provided in the printer. An electric motor such as a DC motor is used for the carriage motor, for example.

The electric motor such as the carriage motor generates heat corresponding to a power consumed by driving. Since the electric motor is designed to be used at a standard temperature, it is used at the standard temperature or less in an ordinary printing operation.

However, in the case in which an excessive load is applied to the electric motor because the electric motor is driven at a high speed or an excessive sliding resistance is applied during the movement of the carriage, the temperature of the electric motor may exceed the standard temperature. In this case, there has been known heat generating limitation control to take a pause having a predetermined time such that the electric motor can be prevented from breaking down by heat.

Usually, the temperature of the motor is detected by using a temperature sensor. There is supposed that a pause having a predetermined time is taken to carry out heat generating limitation control for limiting heat generation when the temperature of the motor is higher than the standard temperature.

However, there is a problem in that the number of components is increased by using the temperature sensor, resulting in an increase in a manufacturing cost.

SUMMARY OF THE INVENTION

The invention has been made to solve the problems and has a first object to provide a motor control method in a recording apparatus in which the temperature of the heat generation of an electric motor can be estimated comparatively accurately in consideration of a radiation with the passage of time without using a temperature sensor and control for limiting the heat generation of the electric motor can be carried out suitably, and the recording apparatus.

In order to attain the first object, the invention has a second object to estimate the temperature of the heat generation of an electric motor comparatively accurately in consideration of a radiation, thereby reducing a useless pause for the electric motor to enhance the throughput of the recording apparatus.

The invention has a third object to estimate the temperature of the heat generation of the electric motor comparatively accurately in consideration of the radiation with the passage of time without using a temperature sensor.

The invention has a fourth object to estimate the temperature of the heat generation of the electric motor comparatively accurately in consideration of the radiation with the passage of time without using the temperature sensor, thereby deciding the abnormality of the heat generation of the electric motor comparatively accurately.

(1) In order to achieve the first and second objects, the invention is directed to a motor control method in a recording apparatus comprising an electric motor to be driven based on a power supplied from power supply means, comprising the steps of successively obtaining a value related to a heat value based on a consumed current and a driving time of the electric motor, successively obtaining a value related to a heat storage amount of the electric motor in consideration of a radiation by using the value related to the heat value, and controlling the electric motor to take a pause at an interval of a driving operation thereof based on the value related to the heat storage amount.

According to the invention, the value related to the heat value is obtained based on the consumed current and the driving time of the electric motor, and furthermore, the value related to the heat storage amount of the electric motor is successively obtained in consideration of the radiation by using the value related to the heat value and the electric motor is controlled to take a pause at the interval of the driving operation thereof based on the value related to the heat storage amount. The heat generation temperature of the electric motor is estimated comparatively accurately based on the value related to the heat storage amount. Consequently, the unnecessary pause of the electric motor can be decreased.

(2) In order to achieve the first and second objects, the invention is directed to a motor control apparatus in a recording apparatus comprising an electric motor to be driven based on a power supplied from power supply means, comprising heat value acquiring means for successively obtaining a value related to a heat value based on a consumed current and a driving time of the electric motor, heat storage amount acquiring means for successively obtaining a value related to a heat storage amount of the electric motor in consideration of a radiation by using the value related to the heat value, and pause control means for controlling the electric motor to take a pause at an interval of a driving operation thereof based on the value related to the heat storage amount.

According to the invention, by the same functions of the invention described in (1), the heat generation temperature of the electric motor is estimated comparatively accurately based on the value related to the heat storage amount in consideration of the radiation. Consequently, the unnecessary pause of the electric motor can be decreased.

(3) In order to achieve the first and second objects, the invention is directed to a motor control apparatus in a recording apparatus comprising an electric motor to be driven based on a power supplied from power supply means, comprising heat value acquiring means for successively obtaining a value related to a heat value based on a consumed current and a driving time of the electric motor, heat storage amount acquiring means for obtaining a value related to a last heat storage amount in consideration of a radiation by using the value related to the heat value and for adding a value related to a heat value obtained next time by the heat value acquiring means to the value related to the last heat storage amount, thereby obtaining a value related to a present heat storage amount, and pause control means for controlling the electric motor to take a pause at an interval of a driving operation thereof based on the value related to the present heat storage amount.

According to the invention, the value related to the heat value is obtained based on the consumed current and the driving time of the electric motor, the value related to the last heat storage amount is obtained in consideration of the radiation by using the value related to the heat value, and the value related to the heat value obtained next time is added to the value related to the last heat storage amount so that the value related to the present heat storage amount is obtained. The electric motor is controlled to take a pause at the interval of the driving operation thereof based on the value related to the present heat storage amount.

(4) In order to achieve the first and second objects, the invention is directed to a motor control apparatus in a recording apparatus comprising an electric motor to be driven based on a power supplied from power supply means, comprising heat value acquiring means for obtaining a heat value based on a consumed current and a driving time of the electric motor, adding means for obtaining an added value of the heat value with a correcting operation in consideration of a radiation with the passage of time, and pause control means for controlling the electric motor to take a pause at an interval of a driving operation thereof when the added value exceeds a predetermined threshold.

According to the invention, the heat value is obtained based on the consumed current and the driving time of the electric motor and the added value of the heat value is obtained with the correcting operation in consideration of the radiation with the passage of time. When the added value exceeds the predetermined threshold, the electric motor is controlled to take a pause at the interval of the driving operation thereof.

(5) In order to achieve the first and second objects, the invention is directed to a motor control apparatus in a recording apparatus comprising an electric motor to be driven based on a power supplied from power supply means, comprising heat generation temperature estimating means for obtaining a value related to a heat value based on a consumed current and a driving time of the electric motor and for adding the value related to the heat value with a correcting operation in consideration of a radiation, thereby estimating a value related to a heat generation temperature of the electric motor based on the added value, the electric motor being controlled to take a pause at an interval of a driving operation when the value related to the heat generation temperature exceeds a predetermined threshold.

According to the invention, the value related to the heat value is obtained based on the consumed current and the driving time of the electric motor, the value related to the heat value is added with the correcting operation in consideration of the radiation, and the value related to the heat generation temperature of the electric motor is estimated based on the added value. When the value related to the heat generation temperature exceeds a predetermined threshold, the electric motor is controlled to take a pause at the interval of the driving operation.

(6) In order to achieve the first and second objects, the invention is directed to the recording apparatus according to any of (3) to (5), wherein a plurality of predetermined thresholds are provided, and when a corresponding one of the value related to the heat storage amount, the added value and the heat generation temperature estimated value exceeds at least one of the thresholds, the pause control means controls the electric motor to take a pause for a pause time corresponding to the exceeded threshold at an interval of a driving operation of the electric motor.

According to the invention, in the invention described in any of claims (3) to (5), a corresponding one of the value related to the heat storage amount, the added value and the heat generation temperature estimated value exceeds at least one of the thresholds, the electric motor is controlled to take a pause for a pause time corresponding to the exceeded threshold at an interval of a driving operation of the electric motor.

(7) In order to achieve the first and second objects, the invention is directed to a serial type recording apparatus in which a carriage having a recording head is reciprocated in a main scanning direction, thereby carrying out recording over a recording medium by the recording head, comprising an electric motor to be driven for reciprocating the carriage in the main scanning direction, heat value acquiring means for calculating a heat value per unit time based on a consumed current and a driving time of the electric motor, and pause control means for successively adding the heat value per unit time with a correcting operation in consideration of a radiation with the passage of time to obtain an added value and for controlling the electric motor to take a pause time during an inversion of a movement of the carriage when the added value exceeds a predetermined threshold.

According to the invention, the heat value per unit time is calculated by the heat value acquiring means based on the consumed current and the driving time of the electric motor, and the heat value per unit time is successively added with the correcting operation in consideration of the radiation with the passage of time to obtain the added value and the electric motor is controlled by the pause control means to take a pause time at time of the inversion of the movement of the carriage when the added value exceeds the predetermined threshold. In the serial type recording apparatus, accordingly, the heat generation of the electric motor is estimated comparatively accurately based on the added value of the heat value in consideration of the radiation with the passage of time. Consequently, the unnecessary pause of the electric motor can be decreased.

(8) In order to achieve the first and second objects, the invention is directed to a serial type recording apparatus in which a carriage having a recording head is reciprocated in a main scanning direction, thereby carrying out recording over a recording medium by the recording head, comprising an electric motor to be driven for reciprocating the carriage in the main scanning direction, unit heat value acquiring means for calculating a unit heat value per pass of the carriage based on a consumed current and a driving time of the electric motor, heat value acquiring means for successively adding the unit heat value and obtaining a heat value per unit time, and pause control means for successively adding the heat value per unit time with a correcting operation in consideration of a radiation with the passage of time to obtain an added value and for controlling the electric motor to take a pause time at an interval between passes of the carriage when the added value exceeds a predetermined threshold.

According to the invention, the unit heat value per pass of the carriage is obtained by the unit heat value acquiring means based on the consumed current and the driving time of the electric motor, and the unit heat value is successively added to obtain the heat value per unit time by the heat value acquiring means. Then, the heat value per unit time is successively added with the correcting operation in consideration of the radiation with the passage of time to obtain an added value, and furthermore, the electric motor is controlled by the pause control means to take a pause time at the interval between the passes of the carriage when the added value exceeds a predetermined threshold. In the serial type recording apparatus, accordingly, the heat generation of the electric motor is estimated comparatively accurately based on the added value of the heat value in consideration of the radiation with the passage of time. Consequently, the unnecessary pause of the electric motor can be decreased.

(9) In order to achieve the first and second objects, the invention is directed to the recording apparatus according to any of (2) to (8), the electric motor has a speed controlled to move a moving member by one driving through speed setting in which an acceleration and deceleration area and a constant speed area are set, and includes a memory for dividing a consumed current per driving of the electric motor into a load current value depending on a load applied to the electric motor when moving the moving member and a fixed current value corresponding to an inertia portion when accelerating and decelerating the moving member and for storing the fixed current value which is previously obtained, current measuring means for measuring a current in the constant speed area, thereby obtaining a current measured value, and calculating means for calculating a consumed current value per driving by using a load current value determined based on the current measured value in the constant speed area and the fixed current value stored in the memory, the heat value acquiring means obtaining a value related to the heat value by using the consumed current value per driving.

According to the invention, in addition to the functions of the invention in accordance with any of (2) to (8), the speed of the electric motor is controlled to move a moving member by one driving through speed setting in which the acceleration and deceleration area and the constant speed area are set. The consumed current value per driving of the electric motor is divided into the load current value depending on the load applied to the electric motor when moving the moving member and the fixed current value corresponding to the inertia portion when accelerating and decelerating the moving member. The fixed current value obtained previously is stored in the memory. The current in the constant speed area is measured by the current measuring means to obtain the current measured value, thereby determining the load current value based on the current measured value in the constant speed area. Then, the consumed current value per driving is calculated by the operation means with the use of the load current value and the fixed current value stored in the memory. By using the consumed current value and the driving time per driving, the value related to the heat value per driving is obtained.

(10) In the recording apparatus described in (7) or (8) of the invention, the pause control means sets a pause time corresponding to the moving speed and the moving distance of the carriage to have an effective current value per pass of the carriage to be almost equal.

According to the invention, in addition to the functions of the invention (7) or (8), the pause time corresponding to the moving speed and the moving distance of the carriage is set such that the effective current value per pass of the carriage is almost equal by the pause control means. Accordingly, the degree of the limitation of the heat generation in the electric motor is almost equal between the passes in which the moving speed and the moving distance of the carriage are varied. Thus, a stable heat generating limitation can be carried out.

(11) In the recording apparatus according to any of the inventions (2) to (10), the pause control means continuously carries out the heat generating limitation control for limiting the heat generation of the electric motor with the pause time until the added value is decreased to the release threshold which is set to be smaller than the predetermined threshold.

According to the invention, in addition to the functions in accordance with any of the inventions (2) to (10), the heat generating limitation control for limiting the heat generation of the electric motor is continuously carried out with a pause time until the added value is decreased to the release threshold set to be smaller than the predetermined threshold. Accordingly, it is possible to reliably separate the heat generation temperature of the electric motor from an overheat state.

(12) In order to achieve the third object, the invention is directed to a serial type recording apparatus in which a carriage having a recording head is reciprocated in a main scanning direction, thereby carrying out recording over a recording medium by the recording head, comprising an electric motor to be driven for reciprocating the carriage in the main scanning direction, heat value acquiring means for calculating a heat value per unit time based on a consumed current and a driving time of the electric motor, and temperature estimating means for successively adding the heat value per unit time with a correcting operation in consideration of a radiation with the passage of time to obtain an added value and for estimating a heat generation temperature of the electric motor based on the added value.

According to the invention, the heat value per unit time is calculated by the heat value acquiring means based on the consumed current and the driving time of the electric motor. The temperature estimating means sequentially adds the heat value per unit time with the correcting operation in consideration of the radiation with the passage of time to obtain an added value, and furthermore, estimates the heat generation temperature of the electric motor based on the added value. Accordingly, it is possible to estimate the heat generation temperature of the electric motor comparatively accurately. For example, a pause is taken to the interval of the driving operation of the electric motor. Thus, it is possible to suitably carry out the heat generating limitation control to reduce the effective current value.

(13) In order to achieve the third object, the invention is directed to a serial type recording apparatus in which a carriage having a recording head is reciprocated in a main scanning direction, thereby carrying out recording over a recording medium by the recording head, comprising an electric motor to be driven for reciprocating the carriage in the main scanning direction, unit heat value acquiring means for calculating a unit heat value per pass of the carriage based on a consumed current and a driving time of the electric motor, heat value acquiring means for successively adding the unit heat value and obtaining a heat value per unit time, and temperature estimating means for successively adding the heat value per unit time with a correcting operation in consideration of a radiation with the passage of time to obtain an added value and for estimating a heat generation temperature of the electric motor based on the added value.

According to the invention, the unit heat value for one pass unit of the carriage is calculated by the unit calorific value acquiring means based on the consumed current and the driving time of the electric motor, and the unit heat value is successively added to obtain the heat value per unit time by the heat value acquiring means. Then, the temperature estimating means successively adds the heat value per unit time with the correcting operation in consideration of the radiation with the passage of time to obtain an added value, and furthermore, the heat generation temperature of the electric motor is estimated based on the added value. Accordingly, it is possible to estimate the heat generation temperature of the electric motor comparatively accurately. For example, a pause is taken at the interval of the driving operation of the electric motor so that the heat generating limitation control for reducing the effective current value can be carried out suitably.

(14) In order to achieve the fourth object, the invention is directed to a serial type recording apparatus in which a carriage having a recording head is reciprocated in a main scanning direction, thereby carrying out recording over a recording medium by the recording head, comprising an electric motor to be driven for reciprocating the carriage in the main scanning direction, unit heat value acquiring means for calculating a unit heat value per pass of the carriage based on a consumed current and a driving time of the electric motor, heat value acquiring means for successively adding the unit heat value and obtaining a heat value per unit time, and heat generation abnormality deciding means for deciding a heat generation abnormality when an added value obtained by successively adding the heat value per unit time with a correcting operation in consideration of a radiation with the passage of time exceeds a predetermined threshold.

According to the invention, the unit heat value for one pass unit of the carriage is calculated by the unit heat value acquiring means based on the consumed current and the driving time of the electric motor, and the unit heat value is successively added to obtain the heat value per unit time by the heat value acquiring means. Then, the heat generation abnormality deciding means decides a heat generation abnormality when an added value obtained by successively adding the heat value per unit time with the correcting operation in consideration of the radiation with the passage of time exceeds a predetermined threshold. Accordingly, it is possible to decide the heat generation abnormality of the electric motor comparatively accurately.

(15) According to the invention, in the recording apparatus in accordance with any of the inventions (2) to (14) the calculation for obtaining the value related to the heat storage amount or the correcting operation uses a radiation factor determined by a time constant of a radiation system with the passage of time.

According to the invention, in addition to the functions of the invention according to any of claims 2 to 14, the operation for calculating the value related to the heat storage amount or the correcting operation uses the radiation factor determined from the time constant of the radiation system with the passage of time. Therefore, the influence of the radiation is considered accurately to obtain the heat value.

(16) In the invention, the recording apparatus described in (15) further comprises deciding means for deciding whether the radiation system is a heat generation system for carrying out a radiation with heat generation and a radiation system for carrying out the radiation without the heat generation, a radiation factor corresponding to the system decided by the deciding means being selected to carry out the correcting operation.

According to the invention, in addition to the function of the invention (15), the deciding means decides whether the radiation system is the heat radiation system for carrying out a radiation with the heat generation or the radiation system for carrying out the radiation without the heat generation. Then, the radiation factor corresponding to the system decided by the deciding means is selected to carry out the correcting operation.

(17) In the invention, in the recording apparatus described in (16), the deciding means counts the number of movements of a carriage to be driven by the electric motor and decides a system for determining the radiation factor based on the number of the movements of the carriage thus counted.

According to the invention, in addition to the function of the invention (16), the deciding means counts the number of the movements of the carriage to be driven by the electric motor and decides the system for determining the radiation factor based on the number of the movements of the carriage thus counted. Accordingly, it is possible to decide the radiation system comparatively easily.

(18) In the invention, in the recording apparatus according to any of (2) to (17), there is provided a memory for storing an added value obtained immediately before a power supply is turned OFF, the added value stored in the memory when the power supply is turned ON being read and used as an initial value.

According to the invention, a last added value is stored in the memory when the power supply is turned OFF and the added value stored in the memory is read and is used as an initial value when the power supply is turned ON. Accordingly, even if the power supply is turned OFF in such a state that the electric motor generates heat comparatively and the power supply is immediately turned ON, the added value is used as the initial value when the power supply is turned OFF. Therefore, it is possible to prevent the overheat generation state of the electric motor from being eliminated.

BRIEF DESCRIPTION OF THE DRAWINGS

FIG. 7 is a table showing a reference effective current table IT.

FIG. 8 is a table showing a CRI pass time table PT.

FIG. 9 is a table showing a unit heat value reference table QT.

FIGS. 11A and 11B are graphs showing the relationship between a motor current and a unit heat value per unit time, FIG. 11A showing that a pause is not taken and FIG. 11B showing that the pause is taken.

FIG. 16 is a table showing a pause time table W1.

FIG. 17 is a table showing a pause time table W2.

DETAILED DESCRIPTION OF PREFERRED EMBODIMENTS

An embodiment embodying an ink jet type recording apparatus according to the invention will be described below with reference to FIGS. 1 to 19.

Figure 2:
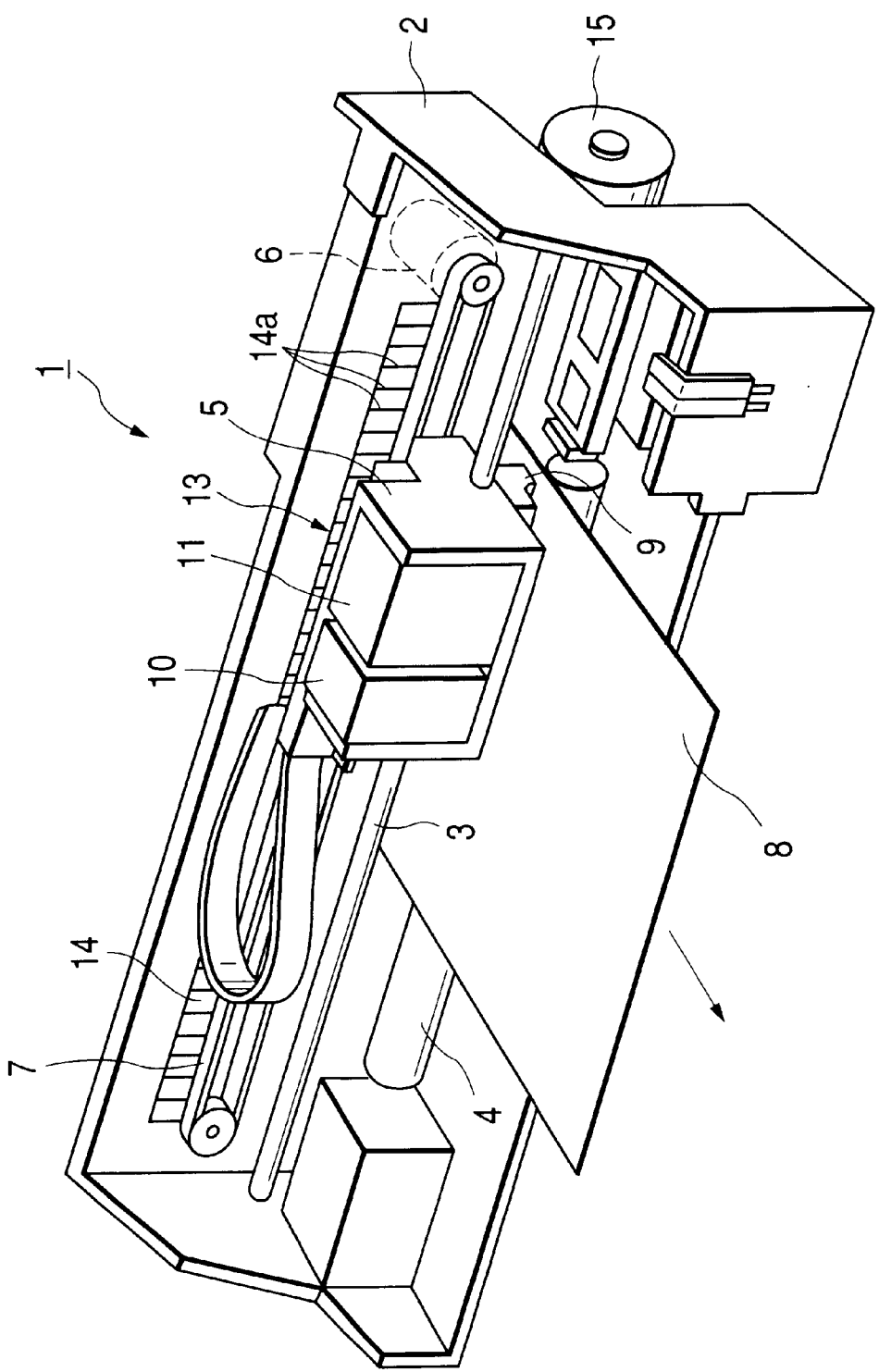
FIG. 2 is a perspective view showing the main part of a printer.

FIG. 2 is a view showing the schematic structure of the inner part of a case in an ink jet type recording apparatus.

As shown in FIG. 2, an ink jet type printer (hereinafter referred to as a printer) 1 as the recording apparatus (printer) comprises a printer body 2 in a case (not shown). The printer body 2 is provided with a carriage 5 which can be guided to a rail (guide rod) 3 and can be reciprocated in a main scanning direction which is parallel with the axial direction of a platen 4. The carriage 5 is driven through a timing belt 7 by means of a carriage motor (hereinafter referred to as a CR motor) 6 to be an electric motor. In the embodiment, a DC motor is used as the CR motor 6.

A print head 9 as a recording head is provided under the carriage 5 on the lower surface side opposed to a paper 8 as a recording medium. A nozzle line (not shown) for each ink color is provided in a multiple line in the print head 9. Ink cartridges 10 and 11 (two kinds for black and coloring) for feeding ink to the print head 9 are removably attached onto the carriage 5. Ink drops are discharged from each nozzle based on the vibrating action of a piezoelectric vibrator provided in the print head 9 so that printing is carried out.

Moreover, a linear encoder 13 for detecting the running speed of the carriage 5 is provided in the printer 1. The linear encoder 13 includes a tape (code tape) 14 which is formed of resin and is to be detected, and an encoder 33 (shown in FIG. 1). The tape 14 is stretched on the back side of the carriage 5 in parallel with a main scanning direction (a carriage running direction), and light projected from a large number of slits 14a formed at a constant pitch in the main scanning direction of the tape 14 is detected by the encoder 33 to be moved integrally with the carriage 5.

Furthermore, a paper feeding motor 15 is provided in the printer 1. When the paper feeding motor 15 is driven, two sets of paper feeding rollers (not shown) arranged in pairs longitudinally in the paper feeding direction of the platen 4 (a direction of an arrow in FIG. 2) are driven so that the paper 8 is fed. In the embodiment, a stepping motor is used for the paper feeding motor 15.

Figure 1:
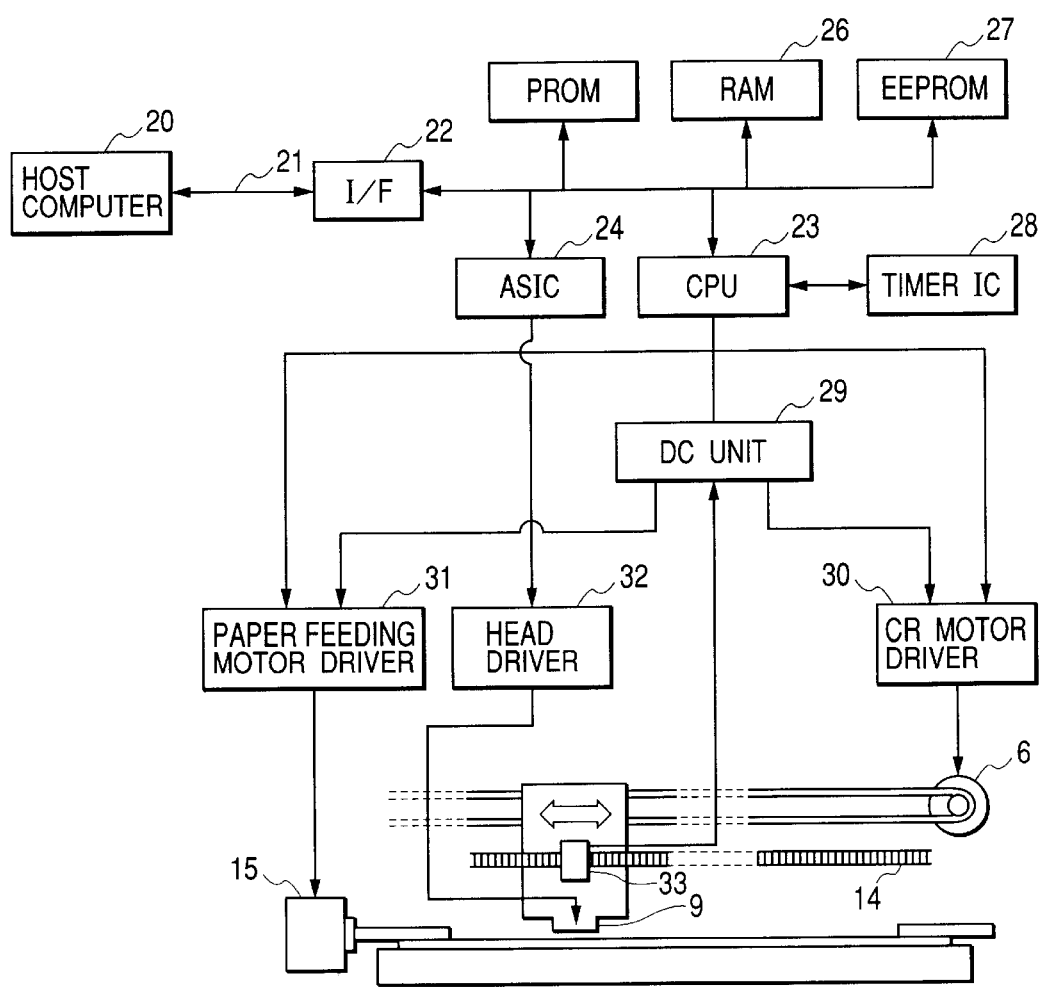
FIG. 1 is a block diagram showing the electrical structure of a printer system according to an embodiment.

FIG. 1 shows the electrical structure of a print driving control system in the printer. As shown in FIG. 1, a host computer (for example, a personal computer) 20 is connected to an interface 22 of the printer 1 through a telecommunication cable 21. The printer 1 comprises a CPU 23, an ASIC (Application Specific IC) 24, an ROM (PROM) 25, an RAM 26, an EEPROM 27, a timer IC 28, a DC unit 29, a carriage motor driver (CR motor driver) 30, a paper feeding motor driver 31, and a head driver 32. The CR motor 6 and the paper feeding motor 15 are connected to the motor drivers 30 and 31, respectively. Moreover, the print head 9 (specifically, each piezoelectric vibrator for each nozzle) is connected to the head driver 32. Sensors such as the encoder 33, a home sensor and a paper detecting sensor (all of which are not shown) are connected to the CPU 23. Pause control means is constituted by the CPU 23, the DC unit and the CR motor driver 30. Moreover, unit heat value acquiring means is constituted by the CPU 23. Heat value acquiring means is constituted by the CPU 23 and the timer IC.

The ASIC 24 carries out image expansion such that print data received from the host computer 20 can be used when the print head 9 is to be controlled, and controls the driving operation of the print head 9 through the head driver 32 based on the data thus image expanded. The RAM 26 functions as a buffer for temporarily storing a result of calculations for various control operations and temporarily storing the print data and the data thus image expanded.

The DC unit 29 converts an alternating current into a direct current, and supplies a direct current corresponding to a command value sent from the CPU 23 to the motor drivers 30 and 31. The CPU 23 controls the voltages of the motors 6 and 15 through the motor drivers 30 and 31. For example, when the speed of the CR motor 6 which is the DC motor is to be controlled, the CPU 23 outputs a control signal to the CR motor driver 30 and the CR motor 6 is controlled in response to a control signal thereof by the motor driver 30 so that the normal and reverse rotations of the CR motor 6 are controlled, for example.

The ROM 25 stores various control programs to be executed by the CPU 23 and various set data to be used in the program execution, and a program for speed control to control the current value of the CR motor 6 and set data thereof are stored therein, for example. Moreover, a program for heat generating limitation control and set data thereof are stored. The heat generating limitation control serves to limit the heat generation such that a motor temperature does not exceed the standard temperature of the motor. The program and the set data will be described below.

The encoder 33 has a projector and a pair of light receiving type sensors provided therein and serves to detect light projected through the slit 14a of the code tape 14, thereby outputting two pulse signals having A and B phases which are shifted by 90 degrees.

Figure 3:
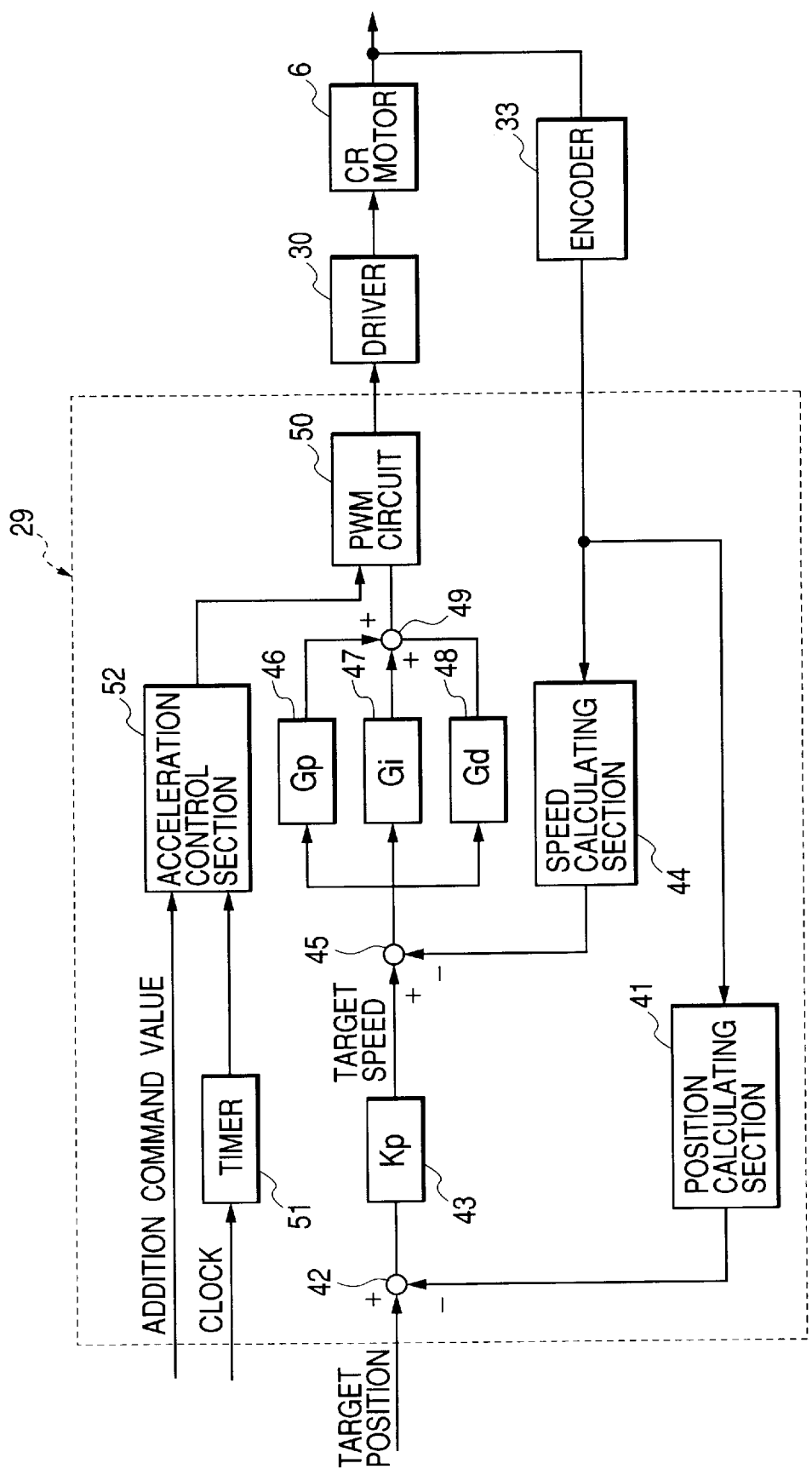
FIG. 3 is a block diagram showing the electrical structure of a DC unit.

FIG. 3 is a block diagram showing the structure of the DC unit 29.

The CD unit 29 is constituted by a position calculating section 41, a subtracter 42, a target speed calculating section 43, a speed calculating section 44, a subtracter 45, a proportional element 46, an integral element 47, a differential element 48, an adder 49, a PWM circuit 50, a timer 51 and an acceleration control section 52.

The position calculating section 41 detects the edge of the output pulse of the encoder 33 and counts the number thereof, and calculates the position of the carriage 5 based on the counted value. According to the normal and reverse rotations of the CR motor 6 which are recognized based on a processing of comparing two pulse signals, a count processing is carried out to increment during the normal rotation and to decrement during the reverse rotation when one edge is detected.

The subtracter 42 calculates a position deviation of a target position sent from the CPU 23 and an actual position of the carriage 5 which is obtained by the position calculating section 41.

The target speed calculating section 43 calculates the target speed of the carriage 5 based on the position deviation to be the output of the subtracter 42. The calculation is carried out by multiplying the position deviation by a gain Kp. The gain Kp is determined depending on the position deviation. The value of the gain Kp may be stored in a table which is not shown.

The speed calculating section 44 calculates the speed of the carriage 5 based on the output pulse of the encoder 33.

More specifically, the pulse cycle of the output pulse of the encoder 33 is counted by a timer counter to calculate a carriage speed V based on the pulse cycle.

The subtracter 45 calculates a speed deviation between a target speed and an actual speed of the carriage 5 calculated by the speed calculating section 44.

The proportional element 46 multiplies the speed deviation by a constant Gp and outputs a result of the multiplication. The integral element 47 adds a result of the multiplication of the speed deviation by a constant Gi. The differential element 48 multiplies a difference between a current speed deviation and a last speed deviation by a constant Gd and outputs a result of the multiplication. The calculation of each of the proportional element 46, the integral element 47 and the differential element 48 is carried out for each cycle of the output pulse of the encoder 33.

Signal values output from the proportional element 46, the integral element 47 and the differential element 48 indicate a duty DX corresponding to the respective results of the calculation. The duty DX indicates a duty percent of (100×DX/2000)%, for example. In this case, the duty DX indicates a duty of 100% with DX=2000, and indicates a duty of 50% with DX=1000.

The outputs of the proportional element 46, the integral element 47 and the differential element 48 are added in the adder 49. A result of the addition is sent as a duty signal to the PWM circuit 50 and a command signal corresponding to the result of the addition is generated by the PWM circuit 50. Based on the command signal thus generated, the CR motor 6 is driven by the driver 30.

Moreover, the timer 51 and the acceleration control section 52 are used for the acceleration control of the CR motor 6, and PID control using the proportional element 46, the integral element 47 and the differential element 48 is used for a constant speed after the acceleration control and deceleration control.

The timer 51 generates a timer interrupt signal at each predetermined time based on a clock signal sent from the CPU 23. The acceleration control section 52 adds a predetermined duty DXP every time the timer interrupt signal is received, and a result of the addition is sent as a duty signal to the PWM circuit 50. In the same manner as the PID control, a command signal corresponding to the result of the addition in the PWM circuit 50 is generated and the CR motor 6 is driven by the driver 30 based on the command signal thus generated.

The driver 30 includes a plurality of transistors, for example, and turns ON/OFF a transistor based on the output of the PWM circuit 50, thereby applying a voltage to the CR motor 6.

Next, the driving control of the CR motor 6 will be described.

Figure 4A:
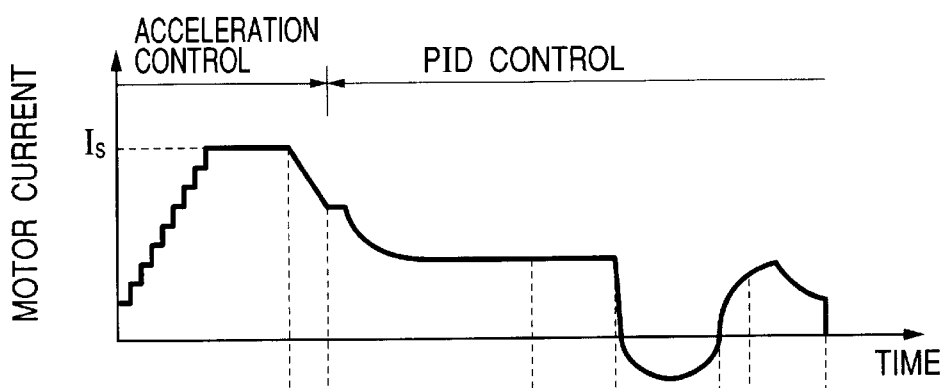
FIG. 4A is a graph showing a motor current value and FIG. 4B is a graph showing a carriage speed.
Figure 4B:
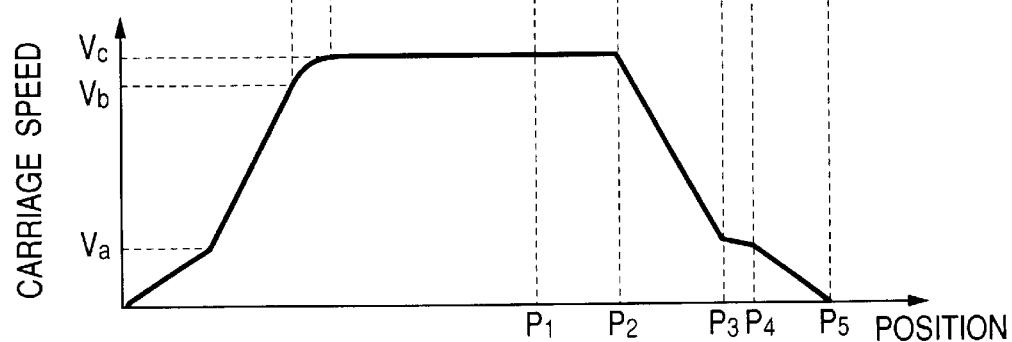

FIGS. 4A and 4B are graphs showing the current value and the carriage speed of the CR motor 6 which are to be controlled by the DC unit 29. The current value is defined according to a voltage value determined from a duty signal value sent from the PWM circuit 50.

In a process in which the carriage 5 runs by one pass (one way for each time), a speed pattern shown in FIG. 4B is set. There are set an acceleration area in which the carriage 5 is accelerated from a stop state, a constant speed area in which a constant speed is maintained after the acceleration, and a deceleration area in which the carriage 5 is decelerated till a stop from the constant speed area. The printing operation of the print head 9 is carried out in the constant speed area.

As shown in FIG. 4A, open control is first carried out in the acceleration area by the DC unit 29, the duty value is increased from an initial value at time of carriage starting so that a current is raised until the carriage speed reaches a target speed Va, a current value is maintained to be constant when the target speed Va is reached, and the current value is slightly reduced when a next target speed Vb is reached. When a target speed Vc is reached, the PID control is started.

In the constant speed area, the PID control is carried out and the duty value is determined such that the carriage speed V is set to be the constant speed Vc. Then, deceleration control is stepwisely carried out every time the carriage 5 reaches positions P1, P2, P3, P4 and P5. For this reason, the position of the carriage 5 is always set to a specified position at a moving distance during an inversion from a returning movement to a going movement or from the going movement to the returning movement.

The CPU 23 determines a printing speed mode of the carriage 5 and a moving distance for one pass based on the print data accepted by the host computer 20. In the embodiment, for example, speed modes in five stages are prepared for the printing speed mode.

The CPU 23 acquires the duty values of the open control and the PID control, and recognizes a voltage value based on the duty values. The CPU 23 has a conversion formula for converting a voltage value into a current value and converts the voltage value into the current value.

Description will be first given to a motor temperature estimation processing and a heat generating limitation control which are employed in the embodiment.

First of all, the motor temperature estimation processing will be further described schematically. In the embodiment, a heat value $Q_{pass}$ per pass is calculated from an effective current value $I_{pass}$ and a moving time $t_{pass}$ for each pulse of the carriage 5 and is sequentially added to obtain a heat value $Q_{sigma}$ per unit time (one minute). The heat value $Q_{sigma}$ per minute is added in consideration of a radiation with the passage of time and a heat storage amount thus calculated is converted into an increase $\Delta T$ in a temperature. The increase $\Delta T$ in a temperature from an initial temperature (for example, a room temperature) is apparent. By observing the increase $\Delta T$ in a temperature, therefore, it is possible to indirectly monitor a current estimated motor temperature.

Then, the heat generating limitation control is executed by using the increase $\Delta T$ in a temperature. More specifically, the heat generating limitation control for taking a pause for each pass is executed when $\Delta T$ exceeds a preset threshold in such a manner that $\Delta T$ is equal to or lower than the standard temperature of an electric motor. In the embodiment, a plurality of thresholds are provided stepwise and a pause time is prolonged stepwise according to $\Delta T$. A pause time required for preventing a user from feeling uncomfortable even if a pause is taken with small $\Delta T$ and for carrying out a reduction to a safe temperature when $\Delta T$ is increased is set into two stages.

First of all, the details of the motor temperature estimation processing will be described below.

In general, the heat value is obtained in the following equation:

$$Q = K \cdot W \text{ (K is a constant which is a coefficient for converting a work into heat generation)}$$

wherein $W = I^2 \cdot R \cdot t$ is set. In other words, $Q = I^2 \cdot R \cdot t \cdot K$ is set.

In consideration of heat generation to be carried out by the operation of the motor, R represents a resistance of a winding of the motor which is a constant. Since R and K are constants as described above, a relationship of $Q \propto I^2 \cdot t$ is obtained. In the following description, therefore, $I^2 \cdot t$ will be referred to as a heat value.

First of all, description will be given to a method of obtaining a heat value per pass. In the embodiment, a unit heat value $Q_{pass}$ per pass ($Q_{pass}$YV in a table) is obtained from a moving speed V and a moving distance Y in the carriage 5 with reference to a table QT shown in FIG. 9. The moving speed V is set into five stages according to the five printing speed modes. The moving distance Y is set to be the range of m moving distances obtained by dividing the longest distance of one pass of the carriage 5 into m parts, and a range to which an actual moving distance X determined by the print data belongs is defined as the moving distance Y.

The unit heat value $Q_{pass}$YV per pass determined by the unit heat value reference table QT is calculated based on a measured current value obtained by a measurement processing of causing the carriage 5 to carry out one reciprocation to measure a motor current value when a system is initialized immediately after the power supply of the printer is turned ON. The unit heat value reference table QT created first is stored in the RAM 26.

The unit heat value $Q_{pass}$ per pass is expressed in the following equation using an effective current value $I_{pass}$ per pass.

$$Q_{pass} = I_{pass}^2 \cdot t_{pass} \qquad (1)$$

Moreover, the effective current value $I_{pass}$ is expressed in the following equation.

$$I_{pass} = \sqrt{\{(I1^2 \cdot t + I2^2 \cdot t + \ldots + Ik^2 \cdot t)/t_{pass}\}} \qquad (2)$$

wherein $t_{pass}$ represents a one-pass moving time of a carriage.

The motor current value is measured by the measurement processing because a load applied to the CR motor 6 during carriage driving is varied due to the number of years of use of the printer (use condition) and a use temperature environment. In order to create an optimum table QT for each printer in consideration of such a variation in the motor load, the measurement processing of measuring a motor current value is employed.

In this case, in the case that the effective current value $I_{pass}$ is measured for each pass in all combinations of the table QT, it is necessary to execute 100 kinds of measurement calculations in total for 5 kinds of moving speeds V and 20 kinds of moving distances so that the carriage 5 is to be reciprocated 100 times. This is not realistic. Therefore, the embodiment has been devised such that the measurement processing of causing the carriage 5 to carry out one reciprocation is enough.

Figure 5A:
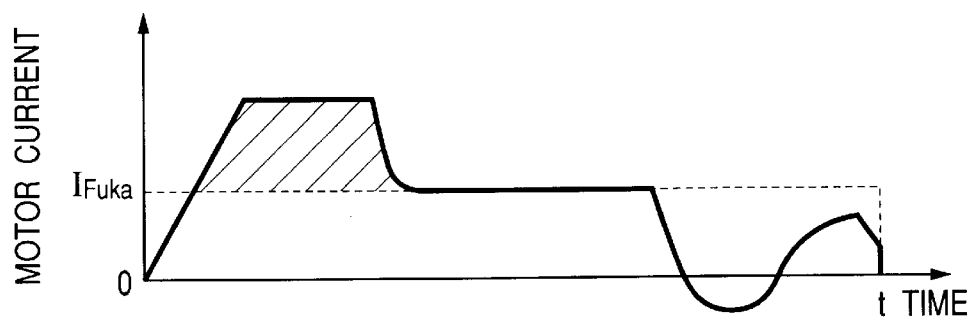
FIGS. 5A and 5B are graphs showing a motor current, FIG. 5A showing a state in which a low load is applied and FIG. 5B showing a state in which a high load is applied.
Figure 5B:
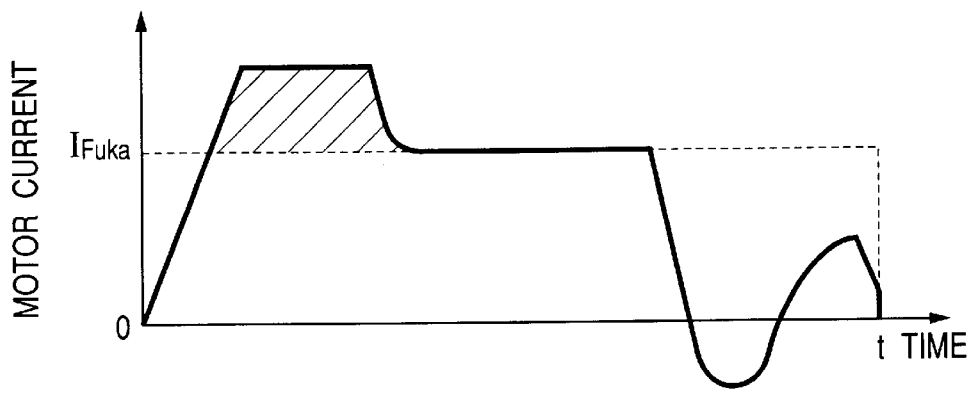

FIGS. 5A and 5B show a time and a motor current value when the carriage passes once, and FIG. 5A shows a state in which a motor load is small and FIG. 5B shows a state in which the motor load is great. The motor current value is great at time of acceleration and is substantially constant in a constant speed area because the carriage is moved against the load, and the carriage is finally stopped after a current flows in a reverse direction and then flows in a normal direction again. The load to be applied to the CR motor 6 is generated by a dynamic friction resistance and a viscosity resistance to a sliding portion such as the rail 3. A constant current value $I_{Fuka}$ in the constant speed area of the CR motor 6 is required for moving the carriage 5 against the load. Accordingly, the current value $I_{Fuka}$ takes a small value as shown in FIG. 5A in a printer having a small load and takes a great value as shown in FIG. 5B in a printer having a great load.

Figure 6:
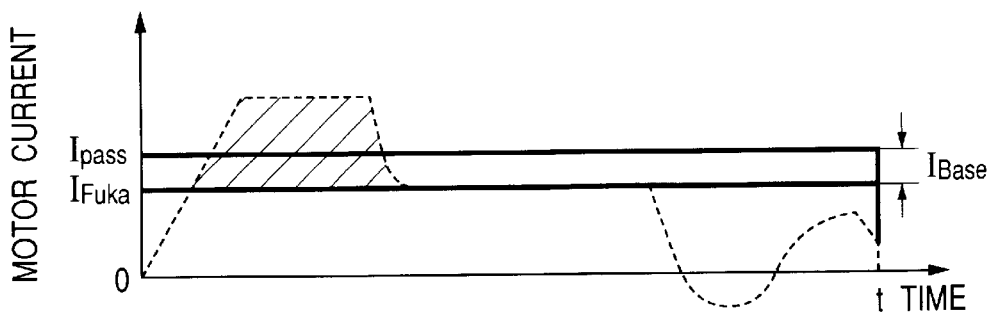
FIG. 6 is a graph for explaining a load current and an adjustable-speed current in a CR motor.

For example, a current portion (a part shown in a slant line in FIGS. 5A and 5B) exceeding $I_{Fuka}$ in the acceleration process is equivalent to an inertia portion caused by a mass M of the carriage 5, which is a constant value depending on the mass M in the same speed mode (acceleration mode). As shown in FIG. 6, an effective current value I-pass per pass is obtained with a division into a current value $I_{Fuka}$ fluctuating depending on the load and a current value $I_{Base}$ corresponding to an inertia portion depending on only the mass M and an acceleration and deceleration mode.

The current value $I_{Fuka}$ is measured by the measurement processing. In this case, the current value $I_{Fuka}$ measured by the measurement processing when the carriage 5 is driven with a maximum moving speed $V_{max}$ (=300 cps) is used in common to all the moving speeds V. The reason is that the current value $I_{Fuka}$ taking a maximum load into consideration is to be measured because a dynamic friction resistance u has a constant value irrespective of the moving speed V and a viscosity resistance η is proportional to the moving speed V in the load.

On the other hand, in accordance with the equation (2), a current value $I_{Base}$ is previously calculated by an experiment, and is stored, in the ROM 25, as a reference effective current table IT shown in FIG. 7. A calculating method is as follows.

More specifically, in accordance with the equation (2), a current value for one pass is successively measured for each very small time t, a value $I^2 \cdot t$ obtained by multiplying a square of an obtained current value I by the very small time t is successively added, and a square root of a value obtained by dividing the added value by a one-pass moving time $t_{pass}$ of the carriage 5 is taken and an effective current value $I_{pass}$ per pass is thus calculated. At this time, the $I_{Fuka}$ is obtained in the following manner. A plurality of values are sampled from the constant speed area having a constant current value, and a sampling value thereof is calculated in accordance with an equation for the effective current value. By subtracting the current value $I_{Fuka}$ from the effective current value I-pass, then, the current value $I_{Base}$ is calculated ($I_{Base} = I_{pass} - I_{Fuka}$). This is measured and calculated for all combinations of a moving speed V and a moving distance Y, and is obtained as each reference effective current $I_{Base}$[Y][V].

Moreover, a carriage one-pass time table PT shown in FIG. 8 is stored in the ROM 25. In the table PT, a moving time $t_{pass}$ [Y][V] (a time required) for causing the carriage 5 to carry out one pass is set to each of the combinations of the moving speed V and the moving distance Y. The moving time $t_{pass}$ [Y][V] is a value obtained by adding each moving time in an acceleration area and a deceleration area to a moving time (Y/V) in a constant speed area and is obtained as a calculated value or a measured value.

In the measurement processing, the current value $I_{Fuka}$ in the constant speed area is measured.

There is measured the constant current value $I_{Fuka}$ in the constant speed area when the carriage is reciprocated once over the longest moving distance (=1800 EP) at a maximum moving speed $V_{max}$ (=300 cps). When, in the constant speed, a constant current value is set, the current value I is subjected to sampling for a very small unit time t to calculate $I^2 \cdot t$ and to successively carry out an addition. A total time ts taken for the sampling is apparent. Therefore, a square root of a value obtained by dividing the added value by the time ts is taken to calculate the effective current value in the constant speed area to be the current value $I_{Fuka}$. As a matter of course, $I_{Fuka}$ can also be obtained by calculating a sampling value in accordance with an equation for the effective current value. In the embodiment in which the voltage of the CR motor 6 is controlled, a current value obtained by converting a sampled voltage value in accordance with a conversion formula is used to measure the $I_{Fuka}$.

Figure 10:
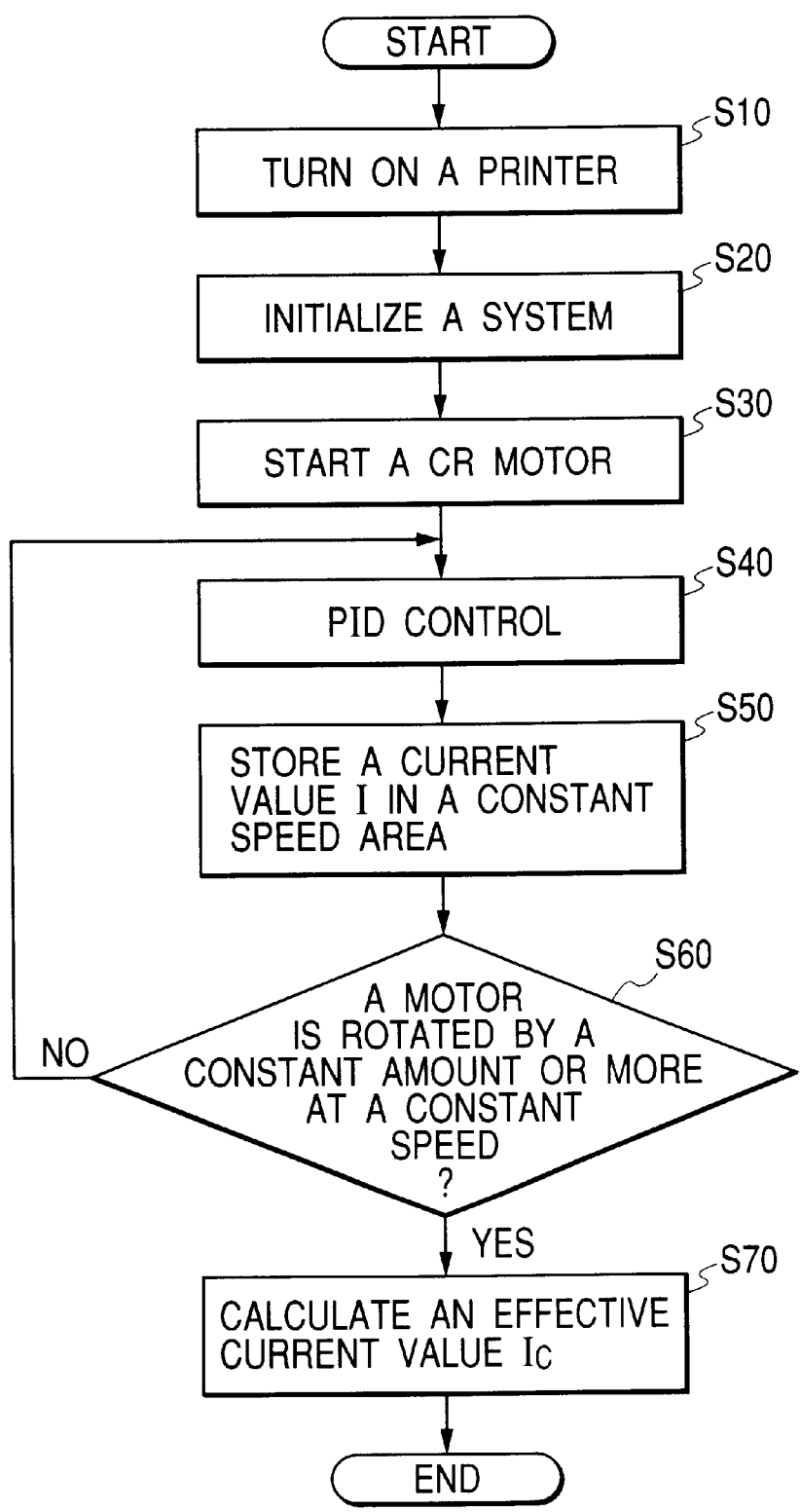
FIG. 10 is a flow chart showing a measurement processing.

The ROM 25 stores a program for the measurement processing shown in a flow chart of FIG. 10. The CPU 23 executes a program for the measurement processing, thereby executing the measurement processing. With reference to the flow chart of FIG. 10, next, description will be given to a current measurement processing (measurement processing) to be executed during carriage preparatory running immediately after the power supply of a printer is turned ON.

First of all, it is recognized that the power supply of the printer is turned ON at a step 10 (which will be hereinafter referred to as "S").

At S20, system initialization is carried out.

At S30, the CR motor 6 is started. At this time, the starting is carried out for one reciprocation over the longest moving distance at a maximum moving speed $V_{max}$. In a first acceleration area, acceleration control is executed by open control.

At S40, PID control is executed. More specifically, when it is in the constant speed area, the PID control is executed.

At S50, a current value I is stored when the constant speed area is started so that a current value becomes constant. More specifically, the current value I in the constant speed area is subjected to sampling.

At S60, it is decided whether or not the motor is rotated in a constant amount or more at a constant speed. More specifically, it is decided whether or not a carriage position obtained by counting the edge of the output pulse of the encoder 33 reaches a position set before the constant speed area is ended. If the carriage position does not reach the set position, the processing returns to the S40. If the carriage position reaches the set position, the processing proceeds to S70. Thus, the current value I is sampled every very small predetermined time t until the carriage 5 reaches the set position.

At the S70, an effective current value Ic in the constant speed area is calculated. More specifically, the effective current value Ic in the constant speed area is calculated in accordance with an equation of an effective current value from n number of current values I which are sampled in the constant speed area. The effective current value Ic is used as $I_{Fuka}$.

When the current value $I_{Fuka}$ is measured by the measurement processing, then, a unit heat value reference table shown in FIG. 9 is created by using the current value $I_{Fuka}$ thus measured, the reference effective current table IT in FIG. 7 and the CRI pass time table PT in FIG. 8. More specifically, the current value $I_{Fuka}$, a reference effective current value $I_{Base}[Y][V]$ and a one-pass time $t_{pass}[Y][V]$ are used to calculate a unit heat value $Q_{pass}[Y][V]$ in the following equation (3). $Q_{pass}[Y][V]=(I_{Base}[Y][V]+I_{Fuka})^2 \cdot t_{pass}[Y][V] \ldots$ (3). Thus, the measurement processing is carried out during carriage preparatory driving immediately after the power supply of the printer is turned ON so that the unit heat value reference table shown in FIG. 9 is created. Loads to be applied to the CR motor 6 are strictly different from each other during the going and returning movements of the carriage 5. For this reason, actually, the tables IT, PT and QT in FIGS. 7, 8 and 9 have two kinds for the going and returning movements of the carriage. For simplicity of the description in the embodiment, description will be given on the assumption that one table is provided without a distinction of the going movement from the retuning movement.

Next, description will be given to the temperature estimation processing to be carried out after the table creation when the power supply of the printer is turned ON. The temperature estimation processing to be carried out after the table creation is always executed during the ON operation of the power supply irrespective of the driving and stop operations of the carriage 5. When the carriage 5 is driven, the unit heat value $Q_{pass}$ per pass is calculated for one pass. In other words, reference is made to the unit heat value reference table QT (FIG. 9) for each pass "start—stop" of the carriage 5 and the heat value $Q_{pass}[Y][V]$ for one-pass is acquired from the moving speed V and the moving distance Y.

FIGS. 11A and 11B are graphs showing the state of a motor current and a heat value $Q_{pass}$ for a time (second) in one minute. As is apparent from the graph of FIG. 1A, the going and returning movements of the carriage 5 are alternately repeated so that the motor current is alternately inverted to be plus or minus for one pass. Based on the moving speed V and the moving distance Y for one pass, the heat value $Q_{pass}[Y][V]$ for the one-pass is acquired with reference to the table QT (FIG. 9). Every time one pass is completed, a present unit heat value $Q_{pass}[Y][V]$ is added to a last heat value $Q_{sigma}$. Thus, the one-pass heat value $Q_{pass}[Y][V]$ to be acquired for each pass is successively added in a unit time $T_{box}$ (=60 seconds) so that a heat value $Q_{sigma}$ per unit time $T_{box}$ is obtained. The heat value $Q_{sigma}$ for one minute is calculated in accordance with an equation of $Q_{sigma}=Q_{sigma}+Q_{pass}[Y][V]$ by adding the present unit heat value $Q_{pass}[Y][V]$ to the last heat value $Q_{sigma}$. An initial value of $Q_{sigma}$ which has not been calculated is "0" and is reset every minute. Accordingly, $Q_{sigma}$ of "0" is obtained when the carriage 5 is not driven at all for one minute.

The CPU 23 times the unit time $T_{box}$ of 60 seconds by a time counter based on a clock signal sent from the timer IC 28. One pass in which the carriage 5 is present in the middle of the pass after the passage of 60 seconds is not added to the present heat value $Q_{sigma}$ for one minute but is input to a next heat value $Q_{sigma}$ for one minute. In the example shown in FIG. 11A, accordingly, only the heat value Q-pass of the pass shown in a slant line is added as a set of the same one minute. In FIG. 11A, a time interval is set between the passes, and is an instantaneous stop which cannot be avoided at time of the inversion of the carriage 5 and is not a pause time.

Next, the heat value $Q_{sigma}$ for one minute is converted into a heat generation temperature (calorific value) $\Delta T_{new}$. $\Delta T_{new}$ is calculated by an equation of $\Delta T_{new}=Ka \cdot Q_{sigma}$. Ka is a conversion factor for a conversion from the heat value Q to the heat generation temperature $\Delta T$ and a value obtained by a preliminary experiment. The heat value of $Q=k \cdot \Delta T$ is proportional to $I_0^2 \cdot R \cdot t$. On the assumption that the heat generation temperature $\Delta T_0$ of the motor is measured when an effective current value $I_0$ is conducted for t seconds in the preliminary experiment, therefore, the heat generation temperature $\Delta T_{new}$ obtained when an effective current value $I_{rms}$ is conducted for t seconds is expressed in the following equations:

$$\Delta T_{new}=(\Delta T_0/I_0^2) \cdot I_{rms}^2$$

$$\therefore \Delta T_{new}=\{\Delta T_0/(I_0^2 \cdot T_{box})\} \cdot Q_{sigma}$$

wherein $\{\Delta T_0/(I_0^2 \cdot T_{box})\}$ is set to be Ka so that $\Delta T_{new}=Ka \cdot Q_{sigma}$ is obtained. On the assumption that $\Delta T_0=20$ deg.

is measured with Io=200 mA, for example, from a preliminary experiment in which the heat generation temperature ΔT of the motor is measured when the effective current value Io is conducted for t seconds, Ka=0.0000083 is obtained with the unit time of $T_{box}$=60 seconds. Accordingly, the heat generation temperature ΔTnew per unit time T-box is expressed in $\Delta T_{new} = Ka \cdot Q_{sigma}$ by using a constant (conversion factor) Ka having the above value.

Figure 12:
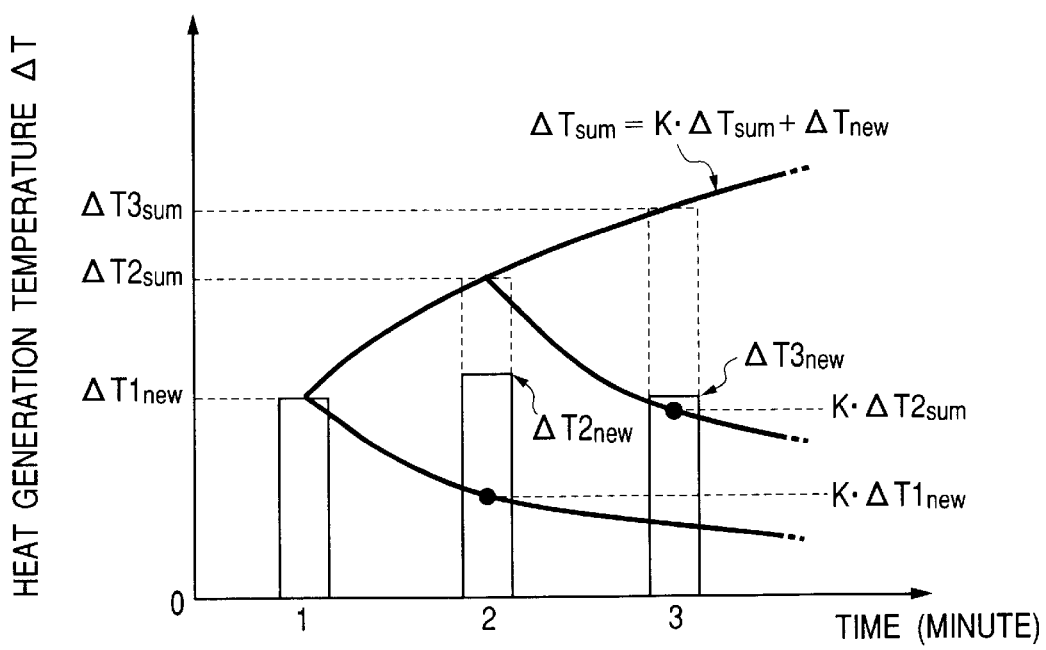
FIG. 12 is a graph for explaining an integrating procedure for calculating a heat generation temperature in consideration of a radiation with the passage of time.
Figure 13:
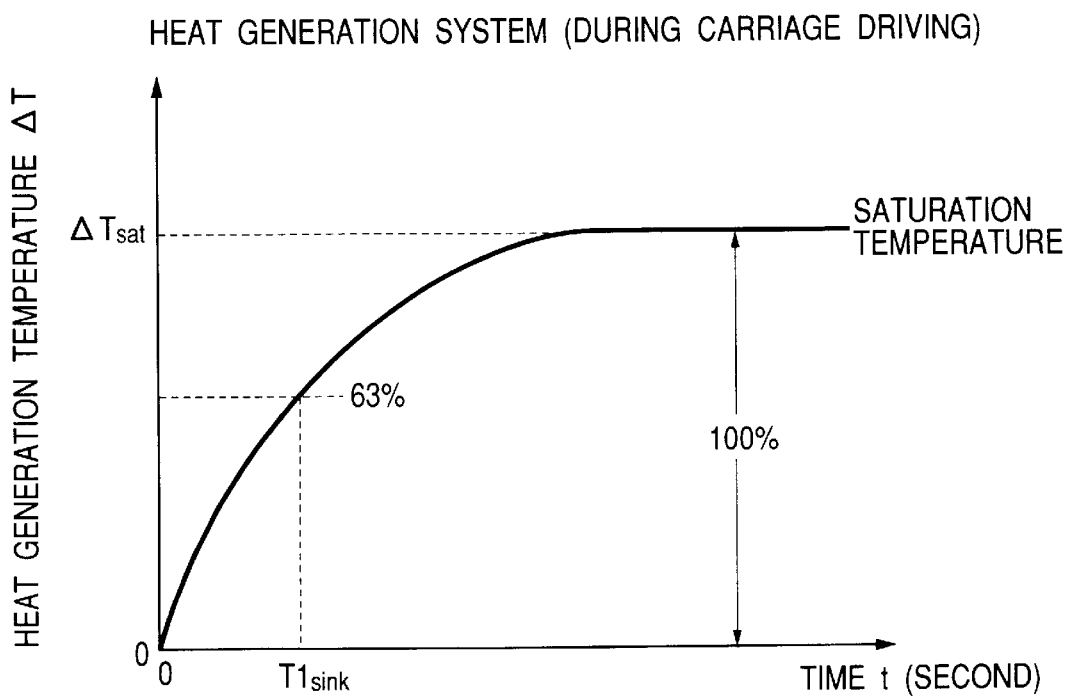
FIG. 13 is a graph showing the radiation temperature curve of a heat generation system.
Figure 14:
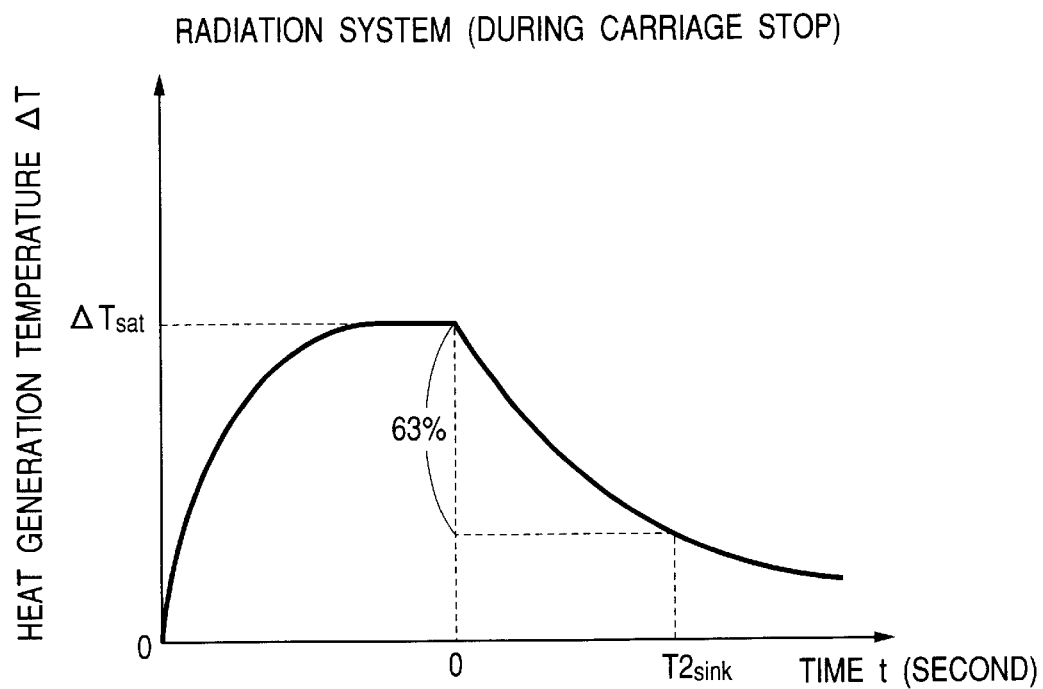
FIG. 14 is a graph showing the radiation temperature curve of a radiation system.

FIG. 12 is a graph showing a total heat generation temperature (total calorific value) caused by the heat generation of a CR motor in consideration of a spontaneous radiation with the passage of time. As shown in the graph, a heat generation temperature (calorific value) obtained by the conduction of the CR motor 6 for a first one minute is represented by $\Delta T1_{new}$, a heat generation temperature obtained by conduction for a next one minute is represented by $\Delta T2_{new}$ and a heat generation temperature obtained by conduction for a further one minute is represented by $\Delta T3_{new}$. The first heat generation temperature $\Delta T1_{new}$ is lowered along a radiation curve with the passage of time and is reduced to $\Delta T1_{old}$ by the spontaneous radiation after one minute. Accordingly, a total heat generation temperature $\Delta T2_{sum}$ for a second minute is represented by $\Delta T2_{sum} = \Delta T1_{old} + \Delta T2_{new}$. Moreover, the total heat generation temperature $\Delta T2_{sum}$ for a second minute is lowered along the radiation curve with the passage of time and is reduced to $\Delta T2_{old}$ by the spontaneous radiation after one minute. Accordingly, a total heat generation temperature $\Delta T3_{sum}$ for a third minute is represented by $\Delta T3_{sum} = \Delta T2_{old} + \Delta T3_{new}$.

A heat generation temperature $\Delta T_{old}$ to which $\Delta T_{sum}$ is reduced along the radiation curve after one minute is expressed in $\Delta Told = K \cdot \Delta T_{sum}$ by using a radiation factor K. Accordingly, the newest motor total heat generation temperature $\neq T_{sum}$ is calculated by adding the newest heat generation temperature ΔTnew to a value obtained by multiplying a last total heat generation temperature $\Delta T_{sum}$ by the radiation factor K and is obtained by an equation of $\Delta T_{sum} = K \cdot \Delta T_{sum} + \Delta T_{new}$. The total heat generation temperature $\Delta T_{sum}$ is equivalent to a value obtained by converting a heat storage amount by the heat generation of the CR motor into a heat generation temperature. In respect of a heat value, accordingly, a present heat generation amount is added to a last heat storage amount so that a present heat storage amount is obtained.

The radiation factor K is previously obtained from an experiment and is set in the following manner. First of all, a printer system includes a heat generation system in carriage driving shown in a temperature curve of FIG. 13 and a radiation system in carriage stop shown in a temperature curve of FIG. 14. Both the heat generation system and the radiation system are primary delay systems. Therefore, a temperature at a certain time t is expressed in exp (−t/T) with a time constant T. In the heat generation system, a saturation heat generation temperature $T_{sat}$ is first obtained by an experiment and a time taken for the saturation temperature $T_{sat}$ to reach a value of 63% is set to be a heat generation time constant $T1_{sink}$ of the printer system. On the other hand, in the radiation system, when the temperature is being dropped to a room temperature at time of the carriage stop after the saturation heat generation, a time taken for a drop in the temperature corresponding to 63% is obtained as the radiation time constant $T2_{sink}$ of the printer system. Both of these time constants $T1_{sink}$ and $T2_{sink}$ are obtained by experiments.

Both the heat generation system and the radiation system are the primary delay systems. Therefore, if the temperature exp (−t/T) at the certain time t is set to be K times after 60 seconds of the unit time Tbox pass, the following equation is formed.

$$exp(-(t+60)/T) = K \cdot exp(-t/T)$$

Accordingly, the radiation factor K for 60 seconds is expressed in the following equation.

$$K = exp(-60/T) \quad (4)$$

If a heat generation time constant $T1_{sink}$ obtained by an experiment with a time constant T is used in the equation (4), a radiation factor $K = exp(-60/T1_{sink})$ in the heat generation system is calculated. If a radiation time constant $T2_{sink}$ obtained by an experiment with the time constant T is used in the equation (4), moreover, a radiation factor $K = exp(-60/T2_{sink})$ in the radiation system is calculated.

In the embodiment, a carriage movement number $N_{cr}$ per unit time $T_{box}$ is counted by a counter. When $N_{cr}$ is equal to or greater than a preset number $N_0$, the heat generation system during carriage driving is decided and the radiation factor K using the heat generation time constant T1sink is used. On the other hand, when the carriage movement number $N_0$ is smaller than the preset number $N_0$, the radiation system in the carriage stop is decided and the radiation factor K using the heat generation time constant T2sink is used. Accordingly, the total heat generation temperature $\Delta T_{sum}$ is calculated as $K \cdot \Delta T_{sum}$ by using the radiation factor K corresponding to the system at that time after 60 seconds pass.

When the power supply of the printer is turned OFF, the heat generation temperature (calorific value) $\Delta T_{sum}$ is subjected to a one-byte processing and is then stored as one-byte data in an EEPROM 27. More specifically, one byte is obtained by $\Delta T_{sum}EE = \Delta T_{sum}/EEdiv$ by using a one-byte factor EEdiv. When the power supply of the printer is turned ON, a final heat value $\Delta T_{sum}EE$ (one byte) in a last operation is acquired by the EEPROM 27 and is developed by $\Delta T_{sum} = \Delta T_{sum}EE \cdot EEdiv$ corresponding to a sequence calculation unit. The value is acquired as a current heat generation temperature and is set to be an initial value of $\Delta T_{sum}$. As a matter of course, after the power supply is turned OFF, a backup power supply may be used to continuously carry out the calculation of $\Delta T_{sum}$ until $\Delta T_{sum}$ is reduced to a predetermined temperature (for example, 10° C.).

Next, the heat generating limitation control will be described with reference to FIGS. 15 to 17.

In order to prevent the heat generation of the CR motor 6, the heat value $Q_{sigma}$ is always calculated every constant time (60 seconds) irrespective of the operation of the carriage 5 while the power supply is ON, and the heat generation temperature $\Delta T_{sum}$ of the CR motor 6 is thus estimated. In the case in which the heat generation temperature $\Delta T_{sum}$ of the CR motor 6 exceeds a specific value (a threshold), a duty limitation (heat generating limitation) for giving a pause time $T_{wait}$ to maintain a short brake state is applied immediately after the carriage 5 is stopped.

Figure 15:
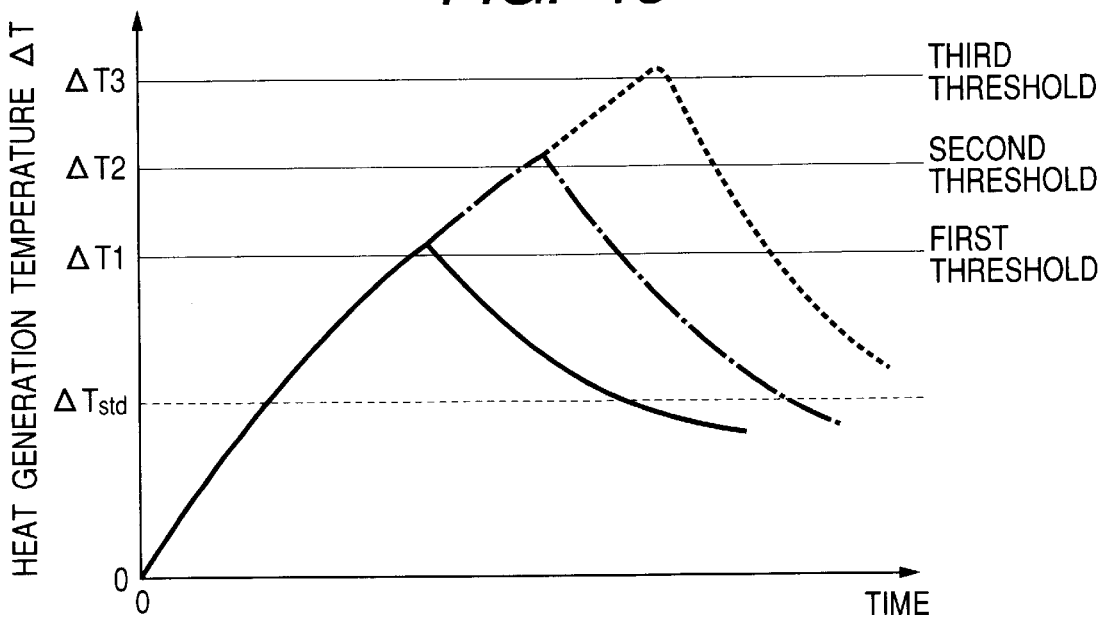
FIG. 15 is a graph for explaining a heat generating limitation processing.

FIG. 15 is a graph showing a temperature curve. As shown in the graph, in the embodiment, three thresholds ΔT1, ΔT2 and ΔT3 (ΔT1<ΔT2<ΔT3) are set as thresholds to which a heat generating limitation is applied. In the embodiment, the first threshold ΔT1 is set to be a lower temperature than a standard temperature. Both the second threshold ΔT2 and the third threshold ΔT3 are set to be lower than the standard temperature of the CR motor 6.

The CPU 23 monitors the hest generation temperature $\Delta T_{sum}$. When $\Delta T_{sum}$ exceeds the thresholds ΔT1, ΔT2 and ΔT3, pause times $T1_{wait}$, $T2_{wait}$ and $T3_{wait}$ corresponding to the exceeded thresholds are set respectively. More specifically, when the heat generation temperature $\Delta T_{sum}$ exceeds the first threshold ΔT1, a duty limitation for taking the pause time $T_{wait}$ is applied.

The ROM 25 stores pause time tables W1 and W2 and a pause time T3wait shown in FIGS. 16 and 17 as data for determining the pause times T1wait, T2wait and T3wait. Reference is made to the pause time table W1 in FIG. 16 when the heat generation temperature $\Delta T_{sum}$ exceeds the first threshold $\Delta T1$. By referring to the table W1, a pause time $T1_{waitYV}$ corresponding to a moving distance Y and a moving speed V is set. The first pause time T1waitYV is set to be such a short time that a user does not feel uncomfortable even if the carriage 5 is stopped with the application of the limitation to the heat generation. For this reason, the user rarely feels uncomfortable even if a pause of the first pause time T1waitYV is taken for each pass.

For example, thus, a time of less than 0.5 second is set under the notion that a pause time is shortened with priority. The pause time T1waitYV corresponding to the moving distance Y and the moving speed V is set because the pause time is to be set to have such an effective current value $I_{rms}$ as to obtain the same target temperature for all the combinations of Y and V in this example. In other words, the pause time $T1_{waitYV}$ is set to have such a value as to take an effective current value $I_{rms}$ to obtain the same temperature in all modes. As a matter of course, the pause time T1wait may be set to 0.2 second in common to all Y and V.

Reference is made to the pause time table W2 in FIG. 17 when the heat generation temperature $\Delta T_{sum}$ exceeds the second threshold $\Delta T2$. By referring to the table W2, a second pause time T2waitYV corresponding to the moving distance Y and the moving speed V is set. The second pause time T2waitYV is set to have such a value that the heat generation temperature $\Delta T_{sum}$ (motor temperature) is reduced to a safe temperature even if a load to be applied to the CR motor 6 is a maximum and a maximum motor current Imax (for example, Imax=0.8 A) is applied to the CR motor 6. Even if the maximum motor current Imax (for example, 0.8 A) is applied to the CR motor 6, the heat generation temperature $\Delta T_{sum}$ is reduced to a target temperature. In the embodiment, a value in a range of approximately 0.7 to 3 seconds is set corresponding to the moving distance Y and the moving speed Vas shown in FIG. 17, for example. The pause time $T2_{waitYV}$ is set corresponding to Y and V because a minimum necessary pause time is set to have such an effective current value Irms as to obtain a safe temperature for all the combinations of Y and V. As a matter of course, the pause time $T2_{wait}$ may be set to approximately 3 seconds in common to all Y and V.

A third pause time $T3_{wait}$ is set to have a common value to all Y and V, for example, approximately 5 seconds. In the case in which the third pause time T3wait exceeds a maximum load (for example, a motor current Imax=0.8 A) in respect of a design which is assumed by the CR motor 6, it is set to have such a value that the heat generation temperature $\Delta T_{sum}$ (motor temperature) is reduced to a safe target temperature even if a maximum supply current $IDC_{max}$ (for example, $IDC_{max}$=1.2 A) in respect of a design which is assumed by the DC unit 29 to be power supply means is applied to the CR motor 6. Even if the maximum supply current $IDC_{max}$ (for example, 1.2 A) is applied to the CR motor 6, the heat generation temperature $\Delta T_{sum}$ is reduced to the target temperature.

A release threshold (release threshold temperature) $\Delta T_{std}$ ($\Delta T_{std} < \Delta T1$) is set to be the safe target temperature. When the duty limitation is once applied, it is not released until the heat generation temperature $\Delta T_{sum}$ is reduced to the release threshold $\Delta T_{std}$. More specifically, when the heat generation temperature $\Delta T_{sum}$ exceeds the first threshold $\Delta T1$, the duty limitation is applied and a transition to the first heat generating limitation mode for taking a pause of the first pause time $T1_{waitYV}$ for one pass is carried out and the first heat generating limitation mode is maintained until the heat generation temperature $\Delta T_{sum}$ is reduced to reach the release threshold $\Delta T_{std}$. Moreover, in the case in which the heat generation temperature $\Delta T_{sum}$ exceeds the second threshold $\Delta T2$ in the first heat generating limitation mode, a transition to the second heat generating limitation mode for taking a pause of the second pause time $T1_{waitYV}$ for one pass is carried out and the second heat generating limitation mode is maintained until the heat generation temperature $\Delta T_{sum}$ reaches the release threshold $\Delta T_{std}$. Similarly, when the heat generation temperature $\Delta T_{sum}$ exceeds the third threshold $\Delta T3$ in the second heat generating limitation mode, a transition to the third heat generating limitation mode for taking a pause of the third pause time $T1_{wait}$ for one pass is carried out and the third heat generating limitation mode is maintained until the heat generation temperature $\Delta T_{sum}$ reaches the release threshold $\Delta T_{std}$. The CPU 23 includes a heat generating limitation mode flag for discriminating any of the three heat generating limitation modes during the duty limitation, and sees the value of the flag to recognize a current heat generating limitation mode.

As shown in FIG. 11B, when a pause of the pause time $T_{wait}$ is taken for one pass, the heat value $Q_{sigma}$ per unit time $T_{box}$ (60 seconds) is reduced (that is, the effective current value $I_{rms}$ for 60 seconds is decreased). During the duty limitation, accordingly, the newest heat generation temperature $\Delta T_{new}$ for one minute is reduced and the total heat generation temperature $\Delta T_{sum}$ is changed to be reduced with the passage of time by $\Delta T_{sum} = K \cdot \Delta T_{sum} + \Delta T_{new}$. The newest heat generation temperature $\Delta T_{new}$ is reduced with an increase in the pause time $T_{wait}$. By setting the pause time $T_{wait}$ in three stages according to the degree of an increase in the temperature of the CR motor 6, therefore, the motor temperature is reliably reduced to a safe target temperature.

The heat generation temperature $\Delta T$sum is calculated as $K_a \cdot Q_{sigma}$. Since the Ka is a constant, it can be obtained by the calculation of $\Delta T$sum. By dividing each threshold (temperature value) by Ka, it is also possible to set the thresholds $\Delta T1$, $\Delta T2$, $\Delta T3$ and $\Delta T_{std}$.

Figure 18:
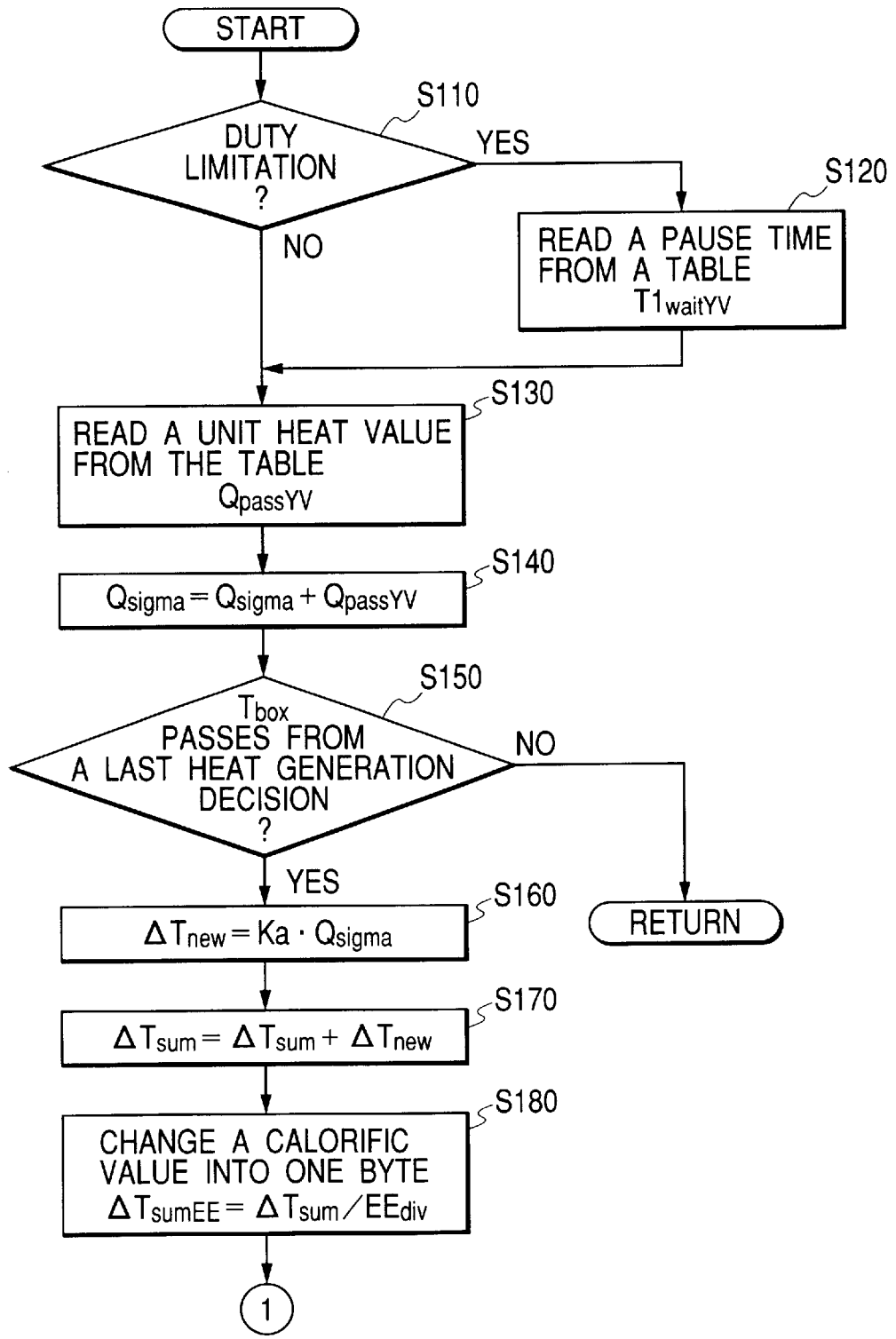
FIG. 18 is a flow chart showing a heat generating limitation processing.
Figure 19:
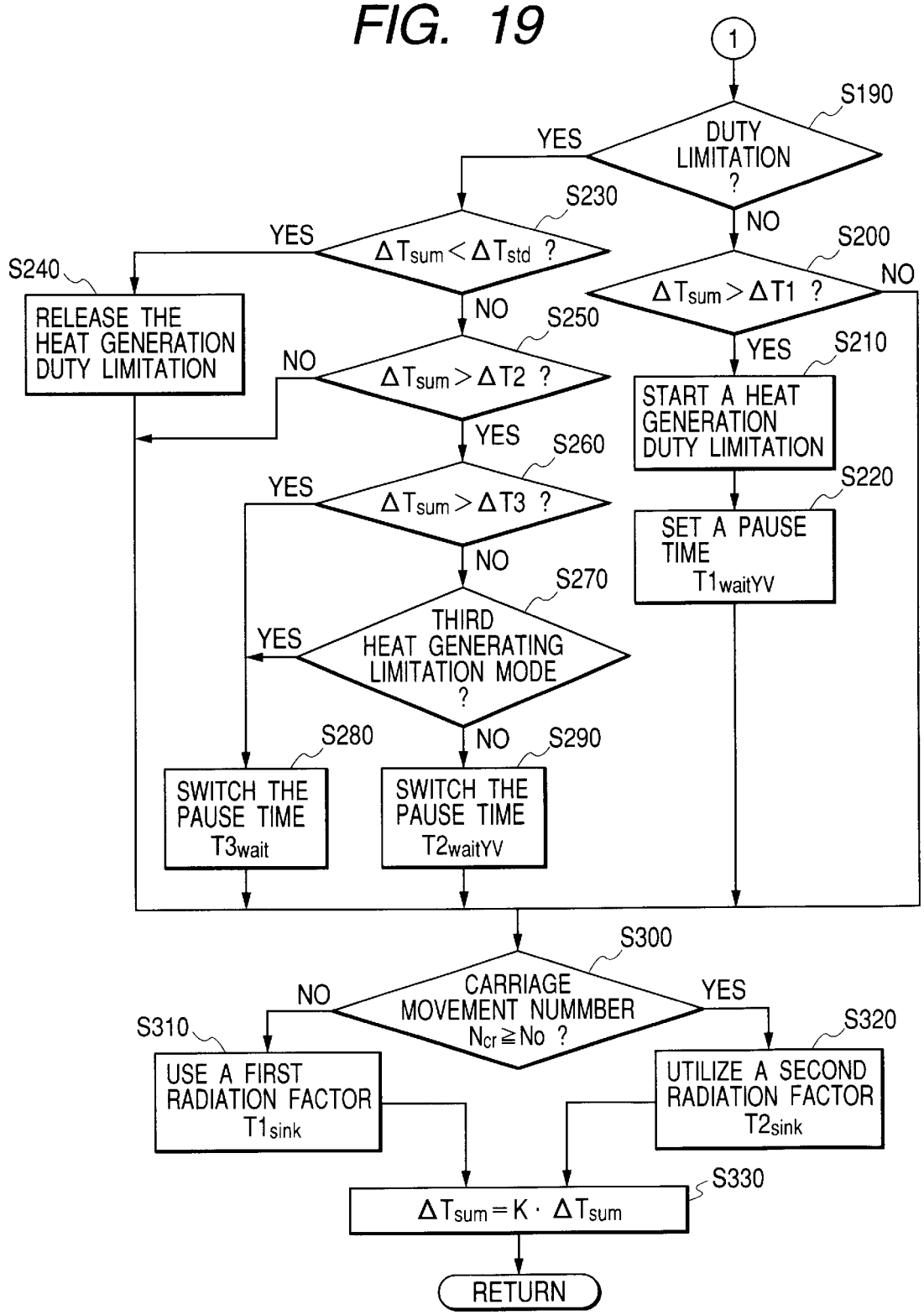
FIG. 19 is a flow chart showing the same processing.

A heat generating limitation control routine will be described below with reference to FIGS. 18 and 19.

At a step (hereinafter referred to as "S") 110, it is decided whether or not a duty limitation is being carried out. If the duty limitation is being carried out, the processing proceeds to S120. If the duty limitation is not carried out, the processing proceeds to S130.

At the S120, a pause time T1waitYV is read from a pause time table W1. By referring to the pause time table W1, the pause time T1waitYV is obtained based on a moving speed V and a moving distance Y for a present pass.

At the S130, a one-pass heat value $Q_{passYV}$ is read from a unit heat value reference table QT. More specifically, a one-pass heat value $Q_{passYV}$ (=1 pass$^2$*t)(1 pass=an effective current value for one pass) is obtained by referring to the unit heat value reference table QT based on the moving speed V and the moving distance Y for the present pass.

At S140, a present one-pass heat value $Q_{passYV}$ is added to a last integral value $Q_{sigma}$ to obtain a present added value $Q_{sigma}$ ($Q_{sigma} = Q_{sigma} + Q_{passYV}$). The $Q_{sigma}$ is a value which is equivalent to an added value obtained by adding values in √ of the equation (1).

At S150, it is decided whether not the unit time $T_{box}$ (=60 seconds) passes at time of the last heat generation decision. When the unit time $T_{box}$ does not pass, the routine is ended. When the unit time $T_{box}$ passes, the processing proceeds to next S160.

At the S160, $\Delta Tnew=Ka \cdot Q_{sigma}$ is calculated. More specifically, the heat value $Q_{sigma}$ of the unit time $T_{box}$ is converted into a raised temperature $\Delta T_{new}$.

At S170, $\Delta T_{sum}=\Delta T_{sum}+\Delta T_{new}$ is obtained. More specifically, the raised temperature $\Delta Tnew$ for a present unit time is added to a last temperature added value to obtain a temperature added value $\Delta T_{sum}$ up to this time.

At S180, a one-byte processing for a calorific value is carried out. Since the calorific value is stored in one byte, $\Delta T_{sum}$ is converted into a value which can be stored in one byte. In other words, $\Delta T_{sum}=\Delta T_{sum}/EEdiv$ is obtained. EEdiv represents a one-byte factor (constant).

At S190, it is decided whether a duty limitation (a heat generating limitation) is being carried out or not. If the duty limitation is not carried out, the processing proceeds to S200. If the duty limitation is being carried out, the processing proceeds to S230. At the S230, the processing is carried out during the duty limitation, which will be described below.

At S200, it is decided whether $\Delta Tsum>\Delta T1$ is set or not. If $\Delta T_{sum}>\Delta T1$ is formed, the processing proceeds to S210. If $\Delta T_{sum}>\Delta T1$ is not formed, the processing proceeds to S300.

At S210, $\Delta T_{sum}$ exceeds $\Delta T1$. Therefore, the heat generation duty limitation is started. At this time, a first heat generating limitation mode flag is turned ON.

At S220, the pause time $T1_{wait}$ of the first heat generating limitation mode is set.

When the duty limitation is being carried out, the processing proceeds to S230. At the S230, it is decided whether $\Delta T_{sum}<\Delta T_{std}$ is formed or not. When $\Delta T_{sum}<\Delta T_{std}$ is formed, the processing proceeds to S240 in which a heat generation duty limitation is released. On the other hand, when $\Delta T_{sum}<\Delta T_{stop}$ is not formed, the processing proceeds to S250.

At the S250, it is decided whether $\Delta T_{sum}>\Delta T2$ is formed or not. When $\Delta T_{sum}>\Delta T2$ is formed, the processing proceeds to S260. When $\Delta T_{sum}>\Delta T2$ is not formed, the processing proceeds to S300.

At S260, it is decided whether $\Delta T_{sum}>\Delta T3$ is formed or not. When $\Delta T_{sum}>\Delta T3$ is not formed, the processing proceeds to S270. When $\Delta T_{sum}>\Delta T3$ is formed, the processing proceeds to S280.

At the S270, it is decided whether a third heat generating limitation mode is being set (a reset time $T_{wait3}$ is being set) or not. When the third heat generating limitation mode is set, the processing proceeds to S280. In other cases, the processing proceeds to S290.

At the S280, a switching to the pause time $T_{wait3}$ of the third heat generating limitation mode is carried out. In other words, when $\Delta Tsum>\Delta T3$ is formed, the third heat generating limitation mode is started and the switching to the pause time Twait3 is carried out.

At the S290, a switching to the pause time $T_{wait2}$ of the second heat generating limitation mode is carried out.

At S300, it is decided whether or not a carriage moving time (pass umber) Ncr is equal to or greater than a set number No. If $Ncr \geq No$ is formed, the processing proceeds to S310. If the condition is not satisfied, the processing proceeds to S320.

At the S310, a first radiation factor is used. More specifically, a heat generation time constant $T1_{sink}$ is set to be a time constant for determining a radiation factor K of a heat generation system such that the radiation factor K is used. The heat generation time constant T1sink is a time constant of the heat generation system which is obtained when the carriage is operated.

At the S320, a second radiation factor is used. More specifically, a heat generation time constant $T2_{sink}$ is set to be a time constant for determining a radiation factor K of a radiation system such that the radiation factor K is used. The radiation time constant $T2_{sink}$ is a time constant of the heat radiation system which is obtained when the carriage is stopped.

At S330, $\Delta Tsum = K \cdot \Delta Tsum$ is calculated. Herein, a total heat generation temperature $\Delta T_{sum}$ after one minute which is to be used as a last total heat generation temperature in a next processing is previously obtained. More specifically, $\Delta T_{sum}$ to be used on the right side of $\Delta T_{sum}=\Delta T_{sum}+\Delta T_{new}$ is previously obtained at S170 in the next processing. At this time, a radiation factor of $K=\exp(-60/T1_{sink})$ is used in the heat generation system and a radiation factor of $K=\exp(-60/T2_{sink})$ is used in the radiation system.

According to the embodiment described above in detail, the following effects can be obtained.

(1) The heat generation temperature $\Delta T_{sum}$ of the CR motor 6 is estimated in consideration of a radiation with the passage of time, and the CR motor 6 takes a pause when the heat generation temperature $\Delta T_{sum}$ exceeds a threshold $\Delta T1$. Therefore, the pause is taken if necessary. Consequently, the number of the pauses can be decreased.

As a result, the CR motor 6 can be reliably protected from excessive heat generation, and furthermore, the pause of the carriage 5 can be shortened so that a printing throughput can be enhanced.

(2) There has been employed a method of carrying out a division into the current value $I_{Fuka}$ in the constant speed area and the current value $I_{Base}$ in the acceleration and deceleration area, storing the current value $I_{Base}$ in the acceleration and deceleration area as a fixed value in the ROM 25, and measuring the current value $I_{Fuka}$ in the constant speed area. By measuring only the current value $I_{Fuka}$ in the constant speed area, therefore, it is possible to obtain the unit heat value $Q_{pass}$ per pass by a simple processing.

(3) The current value $I_{Fuka}$ in the constant speed area is measured by a measurement processing when the power supply of the printer is turned ON, and the unit heat value reference table QT is previously created by using the data $I_{Base}$ and $t_{pass}$ of the tables IT and PT which are prestored in the ROM 25. There has been employed a method of obtaining the unit heat value $Q_{pass}$ per pass by referring to the table QT from the moving speed V and the moving distance Y during an actual printing operation. Therefore, it is not necessary to carry out a current measurement processing and a calculation processing during the printing operation and it is possible to easily obtain the unit heat value $Q_{pass}$ per pass by only a processing of referring to the table QT. Accordingly, the burden of the CPU 23 can be relieved.

(4) There has been employed a method of adding the heat value (added value) $Q_{sigma}$ per unit time which is obtained by adding the heat value $Q_{pass}$ per pass for the unit time $T_{box}$ (one minute) in consideration of a radiation for each unit time, thereby calculating the current total heat generation temperature $\Delta T_{sum}$. As compared with a method of calculating a heat generation temperature per pass, accordingly, the burden of the CPU 23 can be more relieved. Moreover, the heat value $Q_{sigma}$ is added per constant unit time $T_{box}$. Therefore, it is possible to use the same radiation factor of K ($\nabla K=\exp(-T_{box}/T_{sink})$) at each time in the same system. Accordingly, a simple addition processing of calculating $\Delta T_{sink}$ is enough.

(5) In the case in which the spontaneous radiation with the passage of time at the heat generation temperature $\Delta T_{sum}$ (heat value $Q_{sigma}$) is taken into consideration, it is decided whether the heat generation system for carrying out a radiation while generating heat or the radiation system for carrying out the radiation with less heat generation is used. The radiation factor K suitable for the same system is employed. By employing the radiation factor K suitable for the system accordingly, the heat generation temperature $\Delta T_{sum}$ can be calculated as a value which is close to an actual heat generation temperature so that precision in the estimation of the heat generation temperature can be enhanced.

(6) There has been employed the method of deciding whether or not the carriage moving number Ncr is equal to or greater than the set number No, thereby judging a system for determining the radiation factor K. Therefore, it is possible to easily decide the system for determining the radiation factor K. As compared with a method of monitoring a change in a temperature to decide a system, for example, the burden of the CPU 23 can be more relieved.

(7) There are set a plurality of (three in the example) thresholds to take a pause when the heat generation temperature $\Delta T_{sum}$ exceeds the threshold. Accordingly, a pause time to be taken when the heat generation temperature $\Delta T_{sum}$ exceeds the threshold to apply a heat generating limitation can be set stepwise according to the threshold. Therefore, it is possible to set a pause time $T_{wait}$ which is as short as possible for the heat generation temperature $\Delta T_{sum}$. As a result, the pause time $T_{wait}$ can be shortened as much as possible, and furthermore, the printing throughput can be enhanced effectively.

(8) The first pause time $T1_{waitYV}$ to be set when the heat generation temperature $\Delta T_{sum}$ exceeds the first threshold $\Delta T1$ is set to be such a short time (for example, less than 0.5 second) that a user does not feel uncomfortable even if the carriage takes a pause while applying the heat generating limitation. As a result, the user rarely feels uncomfortable even if the carriage 5 takes a pause every pass.

(9) The second pause time $T2_{waitYV}$ to be set when the heat generation temperature $\Delta T_{sum}$ exceeds the second threshold $\Delta T2$ is set to be such a time that the heat generation temperature $\Delta Tsum$ (motor temperature) is reduced to a safe temperature even if a maximum load is applied to the CR motor 6 and a maximum motor current Imax (for example, $I_{max}=0.8$ A) is applied to the CR motor 6. Even if the maximum motor current $I_{max}$ (for example, 0.8 A) is applied to the CR motor 6, accordingly, the heat generation temperature $\Delta T_{sum}$ can be reduced to a target temperature in the second heat generating limitation mode.

(10) The pause time tables W1 and W2 are prepared and the pause time $T1_{waitYV}$ and $T2_{waitYV}$ are set according to the moving distance Y and the moving speed V to have the same effective current value Irms with which a reduction to a safe target temperature can be carried out. More specifically, the pause times $T1_{waitYV}$ and $T2_{waitYV}$ are set such that the degrees of the heat generating limitation in all Y and V are equal to each other. Accordingly, it is possible to set an almost minimum pause time which is necessary for the reduction to the safe target temperature for the passes having different combinations of Y and V. Consequently, the printing throughput can be enhanced effectively.

(11) The third pause time T3wait to be set when the heat generation temperature $\Delta T_{sum}$ exceeds the third threshold $\Delta T3$ is set to have such a value that the heat generation temperature $\Delta T_{sum}$ (motor temperature) is reduced to a safe target temperature even if the supplied maximum current $I_{DCmax}$ (for example, $I_{DCmax}=1.2A$) in respect of a design assumed by the DC unit 29 is applied to the CR motor 6. Even if the supplied maximum current $I_{DCmax}$ applied to the CR motor 6, accordingly, the heat generation temperature $\Delta T_{sum}$ can be reduced to the target temperature.

(12) When the heat generating limitation (duty limitation) is once applied, it is not released until the heat generation temperature $\Delta T_{sum}$ is reduced to the release threshold $\Delta T_{std}$. Accordingly, the heat generation temperature $\Delta T_{sum}$ can be reduced to a safe target temperature quickly and reliably.

(13) The heat generating limitation is not released until the heat generation temperature $\Delta T_{sum}$ is reduced to the release threshold $\Delta T_{std}$, and furthermore, a longer pause time $T_{wait}$ set in the heat generating limitation mode when a reduction in a temperature from the second heat generating limitation mode or the third heat generating limitation mode is started is maintained until it reaches the release threshold $\Delta T_{std}$. Accordingly, the heat generation temperature $\Delta T_{sum}$ can be reduced to the safe target temperature more quickly and reliably.

The embodiment is not restricted to the foregoing but can also be carried out in the following variants.

First Modification

It is also possible to employ a method of carrying out a measurement processing of measuring a current value for each pass during a printing operation and calculating a unit heat value $Q_{pass}$ per pass based on a measured current.

Second Modification

It is also possible to estimate (calculate) the temperature of an electric motor other than a CR motor provided in a printer by the temperature estimating method. Examples of the electric motor include a paper feeding motor.

Third Modification

While the pause is taken every pass in the embodiment, it is also possible to take a pause every plural passes. For example, the pause may be taken every two passes (one reciprocation), three passes, four passes, five passes, and furthermore, ten passes. Moreover, the pause may be taken in a timing at time of the end of a first one pass after the passage of one second with management based on the time, for example. This time is not restricted to one second but maybe two seconds, three seconds, . . . .

Fourth Modification

While the pause time of the motor is taken when the motor temperature exceeds the threshold in the embodiment, it is also possible to provide means for carrying out power regulation to reduce the power of the motor. For example, in the case in which a printing speed is set in a high speed mode and the motor temperature exceeds the threshold, control for carrying out a switching into a low speed mode to reduce the power is employed and control contents to reduce the heat generation of the motor can also be employed.

Fifth Modification

While the pause time is taken at an interval between the driving operations of the motor when the heat generation temperature of the motor exceeds the threshold in the embodiment, it is also possible to provide power blocking means for blocking the supply of the power to the motor when the heat generation temperature exceeds the threshold. In this case, a fourth threshold is provided on the higher temperature side than a third threshold, and the current supply to the motor is blocked to stop the carriage emergently when the fourth threshold is exceeded. According to this method, also in the case in which the third threshold is exceeded, particularly, in case of emergency, the motor temperature can be reduced quickly and the temperature fatigue of a motor winding can be minimized as much as possible.

Sixth Modification

In the embodiment, there has been employed the method of maintaining a longer pause time $T_{wait}$ set in the heat generating limitation mode when the temperature is dropped until the heat generation temperature $\Delta T_{sum}$ reaches the release threshold $\Delta T_{old}$ when the heat generating limitation (duty limitation) is once applied. On the other hand, it is also possible to employ a method of switching a pause time to have a lower value by one stage when the heat generation temperature $\Delta T_{sum}$ is dropped to have the threshold $\Delta T3$ or $\Delta T2$ or less.

Seventh Modification

The time constant for determining the radiation factor K is divided into two portions, that is, the heat generation system and the radiation system. Furthermore, a plurality of (three or more) time constants may be prepared. For example, it is also possible to employ a method of determining a time constant in three stages or more according to the number of carriage movements per unit time. Moreover, a decision for determining the radiation factor K is not restricted to the number of the carriage movements. For example, it is also possible to use a method of deciding a system to monitor a change in a temperature and employing a radiation factor K suitable for the system.

Eighth Modification

A unit time for obtaining a heat value is not restricted to a constant time. For example, it is also possible to define the unit time by the number of passes, thereby setting a time required for a constant pass number to be the unit time. In this case, the unit time is irregular. If the unit time is timed by a timer, the time can be known. Consequently, a heat value per unit time can be known. In other words, the radiation factor K is a function of a time. Therefore, if the time can be known, the radiation can also be calculated accurately.

Ninth Modification

A unit time is not restricted to one minute. 10 seconds, 20 seconds, 30 seconds, 2 minutes, 5 minutes and 10 minutes can also be set. A unit time of 10 seconds to 5 minutes is particularly preferable. A change in a heat generation temperature is comparatively slow with respect to a time. Therefore, the operation burden of a heat generation decision is increased if the unit time is less than 10 seconds, and the application of the heat generating limitation might be delayed if the unit time exceeds 5 minutes.

Tenth Modification

The radiation of an electric motor is not restricted to the spontaneous radiation. For example, a cooling fan for cooling the CR motor 6 is provided, and it is also possible to employ a method of carrying out a correcting operation (radiation operation) in consideration of the radiation by fan cooling.

Eleventh Modification

A method of taking a pause during the inversion of the carriage is not restricted. It is necessary to take a pause at time of an inversion in order to carry out constant-speed printing in the carriage of a printer. In a one-way printing type printer, for example, it is also possible to take a pause in the middle of a return pass in which the carriage does not carry out a printing operation.

Twelfth Modification

While the heat value is calculated in consideration of the radiation every unit time $T_{box}$ including a plurality of passes in the embodiment, the heat value may be calculated every pass, for example. Moreover, heat generation may be decided every pass. In this case, a time interval at which the heat value is added is irregular. Therefore, the radiation factor is variable corresponding to the irregular time interval.

Thirteenth Modification

The calculation based on a consumed current and a driving time is not restricted to the heat value. A value related to the heat value is enough. The value related to the heat value is obtained by dividing a heat value Q(J) by a constant, for example, and it is sufficient that the value itself is proportional to the heat value. A unit does not need to represent a heat value (J). In the same manner, moreover, a value related to a heat storage amount (a value which is proportional to or almost proportional to the heat storage amount) may be taken. In the same manner, furthermore, a value related to a heat generation temperature (a value which is proportional to or almost proportional to the heat generation temperature) is enough.

Fourteenth Modification

It is sufficient that a decision value for deciding whether the heat generation temperature of an electric motor exceeds a predetermined temperature threshold to take a pause when the heat generation temperature exceeds the predetermined temperature threshold includes a value related to a heat storage amount, an added value obtained by a correction operation in consideration of the radiation having a heat value, and a value which is proportional to or almost proportional to the heat generation temperature such as a heat generation temperature estimation value. It is possible to decide that the heat generation temperature exceeds the threshold of the temperature based on a comparison of a decision value with a threshold by setting the threshold corresponding to the decision value. The value related to the heat storage amount, the added value and the heat generation temperature estimation value have a proportional relationship with each other. By using any of the values to set the threshold corresponding thereto, it is possible to almost accurately decide whether or not the heat generation temperature of the electric motor exceeds the predetermined temperature threshold. As a matter of course, it is also possible to employ a decision value other than the above-mentioned values.

Fifteenth Modification

It is also possible to employ a method of carrying out a measurement processing of measuring a current value for each pass during a printing operation and calculating a unit heat value $Q_{pass}$ per pass based on the current value thus measured.

Sixteenth Modification

A method of obtaining an effective current value per pass is not restricted to a method of acquiring a current value (a load current value) in a constant speed area and a current value corresponding to an inertia portion (an inertia current value) separately. It is also possible to employ a method of sampling a current value in a whole area during the one-pass movement of the carriage and calculating an effective current value per pass by using the calculation equation of the effective current value.

Seventeenth Modification

In the case in which the electric motor carries out voltage control as in the embodiment, it is also possible to obtain an effective voltage value per driving in the same method as that in the embodiment. Also in the case in which the effective current value is required, it is obtained from the effective voltage value.

Eighteenth Modification

An electric motor is not restricted to a CR motor. For example, the electric motor may be applied to a paper feeding motor. Moreover, a recording apparatus is not restricted to an ink jet type printer but may be applied to a bubble jet type printer, a dot impact type printer or a laser printer.

Nineteenth Modification

A recording apparatus is not restricted to an image recording apparatus. For example, the recording apparatus can also be applied to a recording apparatus for an industrial purpose (a liquid injector) comprising an electrode material (conductive paste) injection head to be used for forming an electrode, for example, a liquid crystal display or an FED (surface emitting display), a biological organism injection head to be used in biochip manufacture, and a sample injection head to be a precision pipette.

The technical thoughts grasped from the embodiment and the variants will be described below.

(1) A motor control method in a recording apparatus comprising an electric motor to be driven based on a power supplied from power supply means comprises the steps of obtaining a value related to a heat value based on a consumed current and a driving time of the electric motor, obtaining an added value of the heat value with a correcting operation in consideration of a radiation with the passage of time, and controlling the electric motor to take a pause at an interval during a driving operation thereof when the added value exceeds a predetermined threshold.

(2) According to the first aspect of the invention, in the motor control method in the recording apparatus, the electric motor has a speed controlled to move a moving member by one driving through speed setting in which an acceleration and deceleration area and a constant speed area are set, the method comprising the steps of dividing a consumed current value per driving of the electric motor into a load current value depending on a load applied to the electric motor when moving the moving member and a fixed current value corresponding to an inertia portion when accelerating and decelerating the moving member and for storing, in a memory, the fixed current value which is previously obtained, and measuring a current in the constant speed area to obtain a current measured value, and calculating a consumed current value per driving by using a load current value determined based on the current measured value in the constant speed area and an inertial current value stored in the memory.

(3) A motor control method in a recording apparatus comprising an electric motor to be driven based on a power supplied from power supply means comprises the steps of obtaining a heat value based on a consumed current and a driving time of the electric motor, obtaining an added value of the heat value, correcting the added value in consideration of a spontaneous radiation, and controlling the electric motor to take a pause at an interval during a driving operation thereof when the added value thus corrected exceeds a predetermined threshold.

(4) A motor control apparatus in a recording apparatus comprising an electric motor to be driven based on a power supplied from power supply means comprises heat value acquiring means for obtaining a heat value based on a consumed current and a driving time of the electric motor, adding means for obtaining an added value of the heat value, correcting means for correcting the added value in consideration of a spontaneous radiation, and pause control means for controlling the electric motor to take a pause at an interval during a driving operation thereof when the added value thus corrected exceeds a predetermined threshold.

(5) A motor temperature estimating method in a recording apparatus comprising an electric motor to be driven based on a power supplied from power supply means in which a printing carriage is reciprocated by the driving operation of the electric motor, comprises the steps of obtaining a heat value per pass of the carriage based on a consumed current and a driving time of the electric motor, successively adding the heat value to obtain a heat value per unit time, and estimating a heat generation temperature of the electric motor based on an added value obtained by successively adding the heat value in consideration of a radiation with the passage of time.

(6) A motor temperature abnormality detecting method in a serial type recording apparatus comprising an electric motor to be driven based on a power supplied from power supply means in which a carriage having a recording head is reciprocated in a main scanning direction by the driving operation of the electric motor, thereby carrying out recording over a recording medium by the recording head, comprises the steps of calculating a unit heat value per pass of the carriage based on a consumed current and a driving time of the electric motor, successively adding the unit heat value to obtain a heat value per unit time, and deciding a heat generation abnormality of the electric motor when an added value obtained by successively adding the heat value per unit time with a correcting operation in consideration of a radiation with the passage of time exceeds a predetermined threshold.

(7) A motor control method in a serial type recording apparatus comprising an electric motor to be driven based on a power supplied from power supply means in which a carriage having a recording head is reciprocated in a main scanning direction by the driving operation of the electric motor, thereby carrying out recording over a recording medium by the recording head comprising an electric motor to be driven for reciprocating the carriage in a main scanning direction, comprises the steps of calculating a unit heat value per pass of the carriage based on a consumed current and a driving time of the electric motor, successively adding the unit heat value to obtain a heat value per unit time, and controlling the electric motor to take a pause at an interval between passes of the carriage when an added value obtained by successively adding the heat value per unit time with a correcting operation in consideration of a radiation with the passage of time exceeds a predetermined threshold.

(8) A pass in the middle of one pass at time of the passage of a unit time is added to the addition of a next heat value for a unit time.

(9) The unit time is 10 seconds to 5 minutes. Because of 10 seconds or more, the burden of means such as a CPU for deciding heat generation can be relieved. Because of 5 minutes, moreover, there is a low possibility that the heat generating limitation of the electric motor might be delayed.

(10) There is provided power regulating means for reducing the consumed power of the electric motor when the heat generation temperature estimated by the temperature estimating means exceeds a predetermined threshold.

(11) There is provided power blocking means for blocking the supply of a power to the electric motor when the heat generation temperature estimated by the temperature estimating means exceeds the predetermined threshold.

(12) In one of the technical thoughts (1) to (11), the unit time is a constant time.

(13) A program characterized in that a computer is caused to function as each of the means in the recording apparatus.

According to the invention, as described above in detail, the heat generation of the electric motor can be estimated comparatively accurately based on the added value obtained by adding the heat value calculated on the basis of the consumed current and the driving time of the electric motor in consideration of a radiation with the passage of time. Consequently, it is possible to decrease an unnecessary pause for the electric motor. Thus, the throughput of the recording apparatus can be enhanced.

According to the invention, it is possible to estimate the heat generation temperature of the electric motor comparatively accurately in consideration of the radiation with the passage of time without using the temperature sensor.

According to the invention, it is possible to estimate the heat generation temperature of the electric motor comparatively accurately in consideration of the radiation with the passage of time without using the temperature sensor. Thus, the heat generation abnormality of the electric motor can be decided comparatively accurately.

What is claimed is:

1. A motor control method in a recording apparatus comprising an electric motor to be driven based on a power supplied from power supply means, comprising the steps of:

successively obtaining a value related to a heat value based on a consumed current and a driving time of the electric motor;

successively obtaining a value related to a heat storage amount of the electric motor in consideration of a radiation by using the value related to the heat value; and controlling the electric motor to take a pause at an interval of a driving operation thereof based on the value related to the heat storage amount.

2. A motor control apparatus in a recording apparatus comprising an electric motor to be driven based on a power supplied from power supply means, comprising:

heat value acquiring means for successively obtaining a value related to a heat value based on a consumed current and a driving time of the electric motor;

heat storage amount acquiring means for successively obtaining a value related to a heat storage amount of the electric motor in consideration of a radiation by using the value related to the heat value; and pause control means for controlling the electric motor to take a pause at an interval of a driving operation thereof based on the value related to the heat storage amount.

3. The recording apparatus according to claim 2, wherein the electric motor is subjected to a speed control so as to move a moving member by one driving through speed setting in which an acceleration and deceleration area and a constant speed area are set, the recording apparatus comprises: a memory for dividing a consumed current value per driving of the electric motor into a load current value depending on a load applied to the electric motor when moving the moving member and a fixed current value corresponding to an inertia portion when accelerating and decelerating the moving member and for storing the fixed current value which is previously obtained;

current measuring means for measuring a current in the constant speed area, thereby obtaining a current measured value; and calculating means for calculating a consumed current value per driving by using a load current value determined based on the current measured value in the constant speed area and the fixed current value stored in the memory, and wherein the heat value acquiring means obtains the value related to the heat value by using the consumed current value per driving.

4. The recording apparatus according to claim 2, wherein an operation for calculating the value related to the heat storage amount uses a radiation factor determined by a time constant of a radiation system with the passage of time.

5. The recording apparatus according to claim 4, further comprising deciding means for deciding whether the radiation system is a heat generation system for carrying out a radiation with heat generation or a radiation system for carrying out the radiation without the heat generation, wherein a radiation factor corresponding to the system decided by the deciding means being selected to carry out the operation.

6. The recording apparatus according to claim 5, wherein the deciding means counts the number of movements of a carriage to be driven by the electric motor and decides a system for determining the radiation factor based on the number of the movements of the carriage thus counted.

7. The recording apparatus according to claim 2, further comprising a memory for storing an added value obtained immediately before a power supply is turned OFF, wherein the added value stored in the memory when the power supply is turned ON being read and used as an initial value.

8. A motor control apparatus in a recording apparatus comprising an electric motor to be driven based on a power supplied from power supply means, comprising:

heat value acquiring means for obtaining a value related to a heat value based on a consumed current and a driving time of the electric motor;

heat storage amount acquiring means for obtaining a value related to a last heat storage amount in consideration of a radiation by using the value related to the heat value and for adding a value related to a heat value obtained next time by the heat value acquiring means to the value related to the last heat storage amount, thereby obtaining a value related to a present heat storage amount; and pause control means for controlling the electric motor to take a pause at an interval of a driving operation thereof based on the value related to the present heat storage amount.

9. A motor control apparatus in a recording apparatus comprising an electric motor to be driven based on a power supplied from power supply means, comprising:

heat value acquiring means for obtaining a heat value based on a consumed current and a driving time of the electric motor;

adding means for obtaining an added value of the heat value with a correcting operation in consideration of a radiation with the passage of time; and pause control means for controlling the electric motor to take a pause at an interval of a driving operation thereof when the added value exceeds a predetermined threshold.

10. The recording apparatus according to claim 9, wherein a plurality of predetermined thresholds are provided, and when the added value exceeds at least one of the thresholds, the pause control means controls the electric motor to take a pause for a pause time corresponding to the exceeded threshold at an interval of a driving operation of the electric motor.

11. The recording apparatus according to claim 9, wherein the electric motor is subjected to a speed control so as to move a moving member by one driving through speed setting in which an acceleration and deceleration area and a constant speed area are set, the recording apparatus comprise: a memory for dividing a consumed current value per driving of the electric motor into a load current value depending on a load applied to the electric motor when moving the moving member and a fixed current value corresponding to an inertia portion when accelerating and decelerating the moving member and for storing the fixed current value which is previously obtained;

current measuring means for measuring a current in the constant speed area, thereby obtaining a current measured value; and calculating means for calculating a consumed current value per driving by using a load current value determined based on the current measured value in the constant speed area and the fixed current value stored in the memory, and wherein the heat value acquiring means obtains a value related to the heat value by using the consumed current value per driving.

12. The recording apparatus according to claim 9, wherein the correcting operation is an operation using a radiation factor determined by a time constant of a radiation system with the passage of time.

13. The recording apparatus according to claim 12, further comprising deciding means for deciding whether the radiation system is a heat generation system for carrying out a radiation with heat generation and a radiation system for carrying out the radiation without the heat generation, wherein a radiation factor corresponding to the system decided by the deciding means is selected to carry out the correcting operation.

14. The recording apparatus according to claim 13, wherein the deciding means counts the number of movements of a carriage to be driven by the electric motor and decides a system for determining the radiation factor based on the number of the movements of the carriage thus counted.

15. The recording apparatus according to claim 9, further comprising a memory for storing the added value obtained immediately before a power supply is turned OFF, wherein the added value stored in the memory when the power supply is turned ON being read and used as an initial value.

16. A motor control apparatus in a recording apparatus comprising an electric motor to be driven based on a power supplied from power supply means, comprising:

heat generation temperature estimating means for obtaining a value related to a heat value based on a consumed current and a driving time of the electric motor and for adding the value related to the heat value with a correcting operation in consideration of a radiation, thereby estimating a value related to a heat generation temperature of the electric motor based on the added value, wherein the electric motor is controlled to take a pause at an interval of a driving operation when the value related to the heat generation temperature exceeds a predetermined threshold.

17. A serial type recording apparatus in which a carriage including a recording head is reciprocated in a main scanning direction, thereby carrying out recording over a recording medium by the recording head, comprising:

an electric motor to be driven for reciprocating the carriage in the main scanning direction;

heat value acquiring means for calculating a heat value per unit time based on a consumed current and a driving time of the electric motor; and pause control means for successively adding the heat value per unit time with a correcting operation in consideration of a radiation with the passage of time to obtain an added value and for controlling the electric motor to take a pause time during an inversion of a movement of the carriage when the added value exceeds a predetermined threshold.

18. A serial type recording apparatus in which a carriage including a recording head is reciprocated in a main scanning direction, thereby carrying out recording over a recording medium by the recording head, comprising:

an electric motor to be driven for reciprocating the carriage in the main scanning direction;

unit heat value acquiring means for calculating a unit heat value per pass of the carriage based on a consumed current and a driving time of the electric motor;

heat value acquiring means for successively adding the unit heat value to obtain a heat value per unit time; and pause control means for successively adding the heat value per unit time with a correcting operation in consideration of a radiation with the passage of time to obtain an added value and for controlling the electric motor to take a pause time at an interval between passes of the carriage when the added value exceeds a predetermined threshold.

19. A serial type recording apparatus in which a carriage having a recording head is reciprocated in a main scanning direction, thereby carrying out recording over a recording medium by the recording head, comprising:

an electric motor to be driven for reciprocating the carriage in the main scanning direction;

heat value acquiring means for calculating a heat value per unit time based on a consumed current and a driving time of the electric motor; and temperature estimating means for successively adding the heat value per unit time with a correcting operation in consideration of a radiation with the passage of time to obtain an added value and for estimating a heat generation temperature of the electric motor based on the added value.

20. A serial type recording apparatus in which a carriage having a recording head is reciprocated in a main scanning direction, thereby carrying out recording over a recording medium by the recording head, comprising:

an electric motor to be driven for reciprocating the carriage in the main scanning direction;

unit heat value acquiring means for calculating a unit heat value per pass of the carriage based on a consumed current and a driving time of the electric motor;

heat value acquiring means for successively adding the unit heat value to obtain a heat value per unit time; and temperature estimating means for successively adding the heat value per unit time with a correcting operation in consideration of a radiation with the passage of time to obtain an added value and for estimating a heat generation temperature of the electric motor based on the added value.

21. A serial type recording apparatus in which a carriage having a recording head is reciprocated in a main scanning direction, thereby carrying out recording over a recording medium by the recording head, comprising:

an electric motor to be driven for reciprocating the carriage in the main scanning direction;

unit heat value acquiring means for calculating a unit heat value per pass of the carriage based on a consumed current and a driving time of the electric motor;

heat value acquiring means for successively adding the unit heat value to obtain a heat value per unit time; and heat generation abnormality deciding means for deciding a heat generation abnormality when an added value obtained by successively adding the heat value per unit time with a correcting operation in consideration of a radiation with the passage of time exceeds a predetermined threshold.

* * * * *